United States Patent
Prasad et al.

(10) Patent No.: US 12,542,579 B2
(45) Date of Patent: Feb. 3, 2026

(54) RECONFIGURABLE INTELLIGENT SURFACE CODEBOOK

(71) Applicant: QUALCOMM Incorporated, San Diego, CA (US)

(72) Inventors: Narayan Prasad, Westfield, NJ (US); Junyi Li, Fairless Hills, PA (US); Tao Luo, San Diego, CA (US); Mohammad Ali Tassoudji, San Diego, CA (US); Yu-Chin Ou, San Diego, CA (US); Ahmed Bedewy, Hillsborough, NJ (US); Juergen Cezanne, Ocean Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 208 days.

(21) Appl. No.: 18/418,833

(22) Filed: Jan. 22, 2024

(65) Prior Publication Data

US 2025/0240060 A1 Jul. 24, 2025

(51) Int. Cl.
H04B 7/04 (2017.01)
(52) U.S. Cl.
CPC ................................ H04B 7/04026 (2023.05)
(58) Field of Classification Search
CPC .................................................. H04B 7/04026
See application file for complete search history.

(56) References Cited

U.S. PATENT DOCUMENTS

| 2024/0380439 | A1  | 11/2024 | Dai et al. |
| 2025/0015869 | A1* | 1/2025  | Yapici ............... H04B 7/06968 |
| 2025/0158665 | A1* | 5/2025  | Prasad ............... H04B 7/06952 |

FOREIGN PATENT DOCUMENTS

| WO | 2022146830 A2 | 7/2022 |
| WO | 2023129872 A1 | 7/2023 |
| WO | 2023142019 A1 | 8/2023 |
| WO | 2023220978 A1 | 11/2023 |

OTHER PUBLICATIONS

International Search Report and Written Opinion—PCT/US2024/053334—ISA/EPO—Apr. 17, 2025.
Partial International Search Report—PCT/US2024/053334—ISA/EPO—Feb. 7, 2025.

* cited by examiner

*Primary Examiner* — Sung S Ahn
(74) *Attorney, Agent, or Firm* — Harrity & Harrity LLP

(57) ABSTRACT

Various aspects of the present disclosure generally relate to wireless communication. In some aspects, a network entity may receive an indication of a reconfigurable intelligent surface (RIS) configuration associated with a first network node and an indication of one or more RIS codebooks associated with one or more second network nodes. The network entity may transmit, using the RIS configuration associated with the first network node, the one or more RIS codebooks associated with the one or more second network nodes, and one or more link parameters associated with the first network node, an indication of a RIS codebook containing at least one RIS configuration that is associated with the first network node and the one or more second network nodes. Numerous other aspects are described.

30 Claims, 18 Drawing Sheets

RECONFIGURABLE INTELLIGENT SURFACE CODEBOOK

FIELD OF THE DISCLOSURE

Aspects of the present disclosure generally relate to wireless communication and specifically relate to techniques, apparatuses, and methods for a reconfigurable intelligent surface (RIS) codebook.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

SUMMARY

Figure 1:
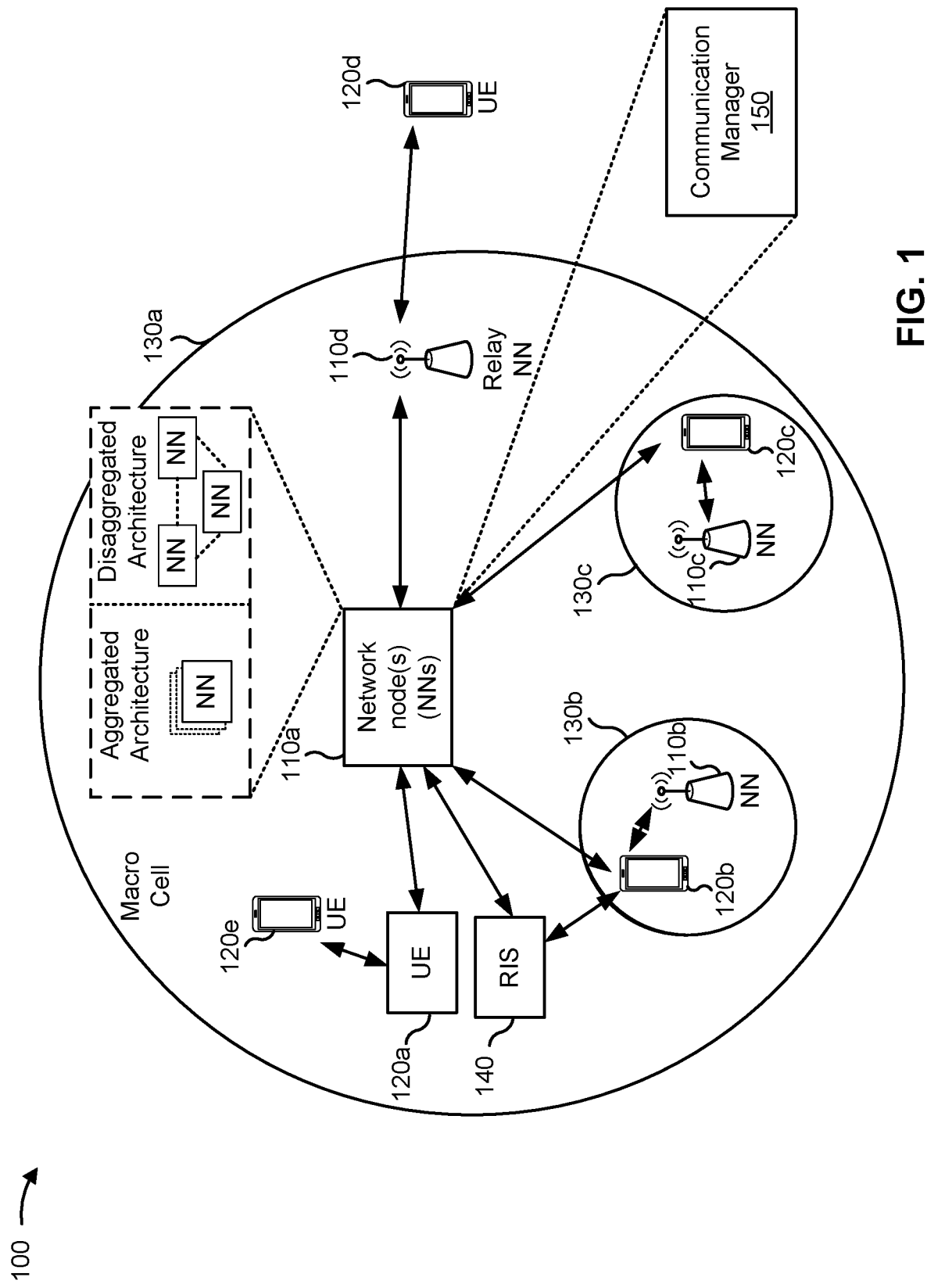
FIG. 1 is a diagram illustrating an example of a wireless communication network in accordance with the present disclosure.

Some aspects described herein relate to an apparatus for wireless communication at a network entity. The apparatus may include one or more memories and one or more processors coupled to the one or more memories. The one or more processors may be configured to cause the network entity to receive an indication of a reconfigurable intelligent surface (RIS) configuration associated with a first network node and an indication of one or more RIS codebooks associated with one or more second network nodes. The one or more processors may be configured to cause the network entity to transmit, using the RIS configuration associated with the first network node, the one or more RIS codebooks associated with the one or more second network nodes, and one or more link parameters associated with the first network node, an indication of a RIS codebook containing at least one RIS configuration that is associated with the first network node and the one or more second network nodes.

Some aspects described herein relate to an apparatus for wireless communication at a network entity. The apparatus may include one or more memories and one or more processors coupled to the one or more memories. The one or more processors may be configured to cause the network entity to receive an indication of one or more RIS capabilities associated with a RIS that includes a plurality of RIS subarrays. The one or more processors may be configured to cause the network entity to transmit, based at least in part on the one or more RIS capabilities, an indication of a RIS codebook that contains at least one RIS configuration of one or more mechanical or material properties corresponding to one or more sets of the plurality of RIS subarrays.

Some aspects described herein relate to a method of wireless communication performed by a network entity. The method may include receiving an indication of a RIS configuration associated with a first network node and an indication of one or more RIS codebooks associated with one or more second network nodes. The method may include transmitting, using the RIS configuration associated with the first network node, the one or more RIS codebooks associated with the one or more second network nodes, and one or more link parameters associated with the first network node, an indication of a RIS codebook containing at least one RIS configuration that is associated with the first network node and the one or more second network nodes.

Some aspects described herein relate to a method of wireless communication performed by a network entity. The method may include receiving an indication of one or more RIS capabilities associated with a RIS that includes a plurality of RIS subarrays. The method may include transmitting, based at least in part on the one or more RIS capabilities, an indication of a RIS codebook that contains at least one RIS configuration of one or more mechanical or material properties corresponding to one or more sets of the plurality of RIS subarrays.

Some aspects described herein relate to a non-transitory computer-readable medium that stores a set of instructions for wireless communication by a network entity. The set of instructions, when executed by one or more processors of the network entity, may cause the network entity to receive an indication of a RIS configuration associated with a first network node and an indication of one or more RIS codebooks associated with one or more second network nodes. The set of instructions, when executed by one or more processors of the network entity, may cause the network entity to transmit, using the RIS configuration associated with the first network node, the one or more RIS codebooks associated with the one or more second network nodes, and one or more link parameters associated with the first network node, an indication of a RIS codebook containing at least one RIS configuration that is associated with the first network node and the one or more second network nodes.

Some aspects described herein relate to a non-transitory computer-readable medium that stores a set of instructions for wireless communication by a network entity. The set of instructions, when executed by one or more processors of the network entity, may cause the network entity to receive an indication of one or more RIS capabilities associated with a RIS that includes a plurality of RIS subarrays. The set of instructions, when executed by one or more processors of the network entity, may cause the network entity to transmit, based at least in part on the one or more RIS capabilities, an indication of a RIS codebook that contains at least one RIS configuration of one or more mechanical or material properties corresponding to one or more sets of the plurality of RIS subarrays.

Some aspects described herein relate to an apparatus for wireless communication. The apparatus may include means for receiving an indication of a RIS configuration associated with a first network node and an indication of one or more RIS codebooks associated with one or more second network nodes. The apparatus may include means for transmitting, using the RIS configuration associated with the first network node, the one or more RIS codebooks associated with the one or more second network nodes, and one or more link parameters associated with the first network node, an indication of a RIS codebook containing at least one RIS configuration that is associated with the first network node and the one or more second network nodes.

Some aspects described herein relate to an apparatus for wireless communication. The apparatus may include means for receiving an indication of one or more RIS capabilities associated with a RIS that includes a plurality of RIS subarrays. The apparatus may include means for transmitting, based at least in part on the one or more RIS capabilities, an indication of a RIS codebook that contains at least one RIS configuration of one or more mechanical or material properties corresponding to one or more sets of the plurality of RIS subarrays.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

DETAILED DESCRIPTION

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the application and design constraints imposed on the overall system.

A network node and a user equipment (UE) may use a reconfigurable intelligent surface (RIS) to communicate with one another. For example, the RIS may reflect or redirect a signal from a transmitter (e.g., the network node or the UE) to a receiver (e.g., the UE or the network node). The RIS may be, or may include, a planar or two-dimensional structure or surface that is designed to have properties to enable a dynamic control of signals or electromagnetic waves reflected and/or redirected by the RIS. The RIS may include one or more reconfigurable elements. For example, the RIS may include an array of reconfigurable elements configured to reflect or redirect an impinging signal in a controlled manner.

In some examples, the RIS may have a RIS array that is partitioned into RIS subarrays controlled by respective network nodes. The partitioning of the RIS array may be fixed or static, which may be suboptimal due to loss in directivity, poor handling of cross-link interference (CLI), or the like. In some examples, the RIS may be partitioned on a TDM-basis (e.g., network nodes may use the RIS during respective sets of time-domain resources). TDM-based partitioning may limit the RIS to provide assistance to each network node intermittently. Furthermore, because the network node that can be assisted by the RIS at a given time interval is determined in advance, TDM-based partitioning limits flexibility. As a result, TDM-based partitioning may reduce spectral efficiency achieved for each network node by half and limit flexibility. Additionally, or alternatively, TDM-based partitioning may entail frequent RIS reconfiguration, which may incur associated RIS reconfiguration downtime and increase power consumed by the RIS (and power may be a scarce resource at the RIS).

Various aspects relate generally to transmitting an indication of a RIS codebook containing at least one RIS configuration. Some aspects more specifically relate to at least one RIS configuration that is associated with a first network node and one or more second network nodes. The at least one RIS configuration may be associated with the first network node and the one or more second network nodes in that the at least one RIS configuration may cause the RIS to apply a pattern of voltage values to respective elements of the RIS that simultaneously enables a network node to communicate with a UE in accordance with the one or more link parameters while one or more other network nodes communicate with one or more other UEs. For example, the RIS codebook May ensure a minimum specified gain for a data link of the first network node and a minimum performance for one or more data links of the one or more second network nodes.

In some aspects, the at least one RIS configuration is of one or more mechanical or material properties corresponding to one or more sets of the plurality of RIS subarrays. The one or more mechanical or material properties may correspond to respective sets of the plurality of RIS subarrays. For example, the one or more mechanical or material properties may include folding of one or more RIS subarrays, one or more orientations or tilts of one or more RIS subarrays, one or more positions of one or more RIS subarrays, one or more shapes of one or more RIS subarrays, one or more substrate permittivities of one or more RIS subarrays, or the like.

Aspects of the subject matter described in this disclosure can be implemented to realize one or more of the following potential advantages. In some examples, by transmitting an indication of a RIS codebook containing at least one RIS configuration, the described techniques can be used to enable a RIS-assisted communications system that achieves improvement over (e.g., overcomes shortcomings attributable to) static partitioning and TDM-based RIS operation. For example, the RIS may simultaneously assist two or more transmitters serving two or more receivers (e.g., in millimeter wave bands) with reduced CLI, improved spectral efficiency, increased flexibility, reduced power consumption, or the like, compared to RIS deployments involving static partitioning or TDM-based RIS operation. As a result, the RIS may be fully exploited, thereby covering RIS deployment costs.

Transmitting an indication of a RIS codebook containing at least one RIS configuration that is associated with first network node and one or more second network nodes may provide minimal loss in directivity in cases where the first network node is associated with static network coverage and the one or more second network nodes are associated with dynamic network coverage. Additionally, or alternatively, transmitting an indication of a RIS codebook containing at least one RIS configuration that is associated with first network node and one or more second network nodes may reduce power consumption compared to reconfiguring an electronic configuration (e.g., altering a set of applied voltages) or a mechanical configuration of the RIS (e.g., in terms of altering orientations, positions, shapes of one or more RIS subarrays, or the like).

Transmitting an indication of a RIS codebook containing at least one RIS configuration of one or more mechanical or material properties corresponding to one or more sets of the plurality of RIS subarrays may improve network coverage in cases where the first and second network nodes are associated with dynamic network coverage (e.g., in cases where the dynamic network coverage associated with the first network node would prompt frequent changes to the RIS codebook containing the at least one RIS configuration that is associated with the first network node and the one or more second network nodes). For example, a RIS, such as an electro-mechanical RIS capable of exploiting electronic, mechanical, and/or material (e.g., substrate) reconfiguration to simultaneously assist multiple network nodes, may mitigate CLI by tilting (e.g., changing orientations) and/or tuning a position, shape, and/or substrate permittivity of the RIS subarrays.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), mmWave technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110a, a network node 110b, a network node 110c, and a network node 110d. The network nodes 110 may support communications with multiple UEs 120, shown as a UE 120a, a UE 120b, a UE 120c, a UE 120d, and a UE 120e.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless networks 100 may be deployed in a given geographic area. Each wireless communication network 100 may support a RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHz), FR2 (24.25 GHz through 52.6 GHZ), FR3 (7.125 GHZ through 24.25 GHZ), FR4a or FR4-1 (52.6 GHz through 71 GHZ), FR4 (52.6 GHZ through 114.25 GHZ), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHZ, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/Long-Term Evolution (LTE) and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or a non-terrestrial network (NTN) network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110*a* may be a macro network node for a macro cell 130*a*, the network node 110*b* may be a pico network node for a pico cell 130*b*, and the network node 110*c* may be a femto network node for a femto cell 130*c*. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (transmit directions and/or beam parameters). Frequency domain resources of some bands may be subdivided into bandwidth parts (BWPs). A BWP May be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110d (for example, a relay network node) may communicate with the network node 110a (for example, a macro network node) and the UE 120d in order to facilitate communication between the network node 110a and the UE 120d. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an extended reality (XR) device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, Institute of Electrical and Electronics Engineers (IEEE) compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced cMTC (feMTC) UEs, or enhanced feMTC (efeMTC) UEs, or further evolutions thereof, all of which may be simply referred to as "MTC UEs". An MTC UE may be, may include, or may be included in or coupled with a robot, an unmanned aerial vehicle or drone, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of ultra-reliable low-latency communication (URLLC), enhanced mobile broadband (eMBB), and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120*a* and UE 120*c*) may communicate directly with one another using sidelink communications (for example, without communicating by way of a network node 110 as an intermediary). As an example, the UE 120*a* may directly transmit data, control information, or other signaling as a sidelink communication to the UE 120*c*. This is in contrast to, for example, the UE 120*a* first transmitting data in an UL communication to a network node 110, which then transmits the data to the UE 120*e* in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during time resources, such as during slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, the wireless network 100 may include a RIS 140. The network node 110 and the UE 120 may use the RIS 140 to communicate with one another. For example, the RIS 140 may reflect or redirect a signal from a transmitter (e.g., the network node 110 or the UE 120) to a receiver (e.g., the UE 120 or the network node 110). The RIS 140 may be, or may include, a planar or two-dimensional structure or surface that is designed to have properties to enable a dynamic control of signals or electromagnetic waves reflected and/or redirected by the RIS 140. The RIS 140 may include one or more reconfigurable elements. For example, the RIS 140 may include an array of reconfigurable elements configured to reflect or redirect an impinging signal in a controlled manner.

In some aspects, the network node 110 may include a communication manager 150. In some examples, as described in more detail elsewhere herein, the communication manager 150 may receive an indication of a RIS configuration associated with a first network node and an indication of one or more RIS codebooks associated with one or more second network nodes; and transmit, using the RIS configuration associated with the first network node, the one or more RIS codebooks associated with the one or more second network nodes, and one or more link parameters associated with the first network node, an indication of a RIS codebook containing at least one RIS configuration that is associated with the first network node and the one or more second network nodes. In some examples, as described in more detail elsewhere herein, the communication manager 150 may receive an indication of one or more RIS capabilities associated with a RIS that includes a plurality of RIS subarrays; and transmit, based at least in part on the one or more RIS capabilities, an indication of a RIS codebook that contains at least one RIS configuration of one or more mechanical or material properties corresponding to one or more sets of the plurality of RIS subarrays. Additionally, or alternatively, the communication manager 150 may perform one or more other operations described herein.

As indicated above, FIG. 1 is provided as an example. Other examples may differ from what is described with regard to FIG. 1.

Figure 2:
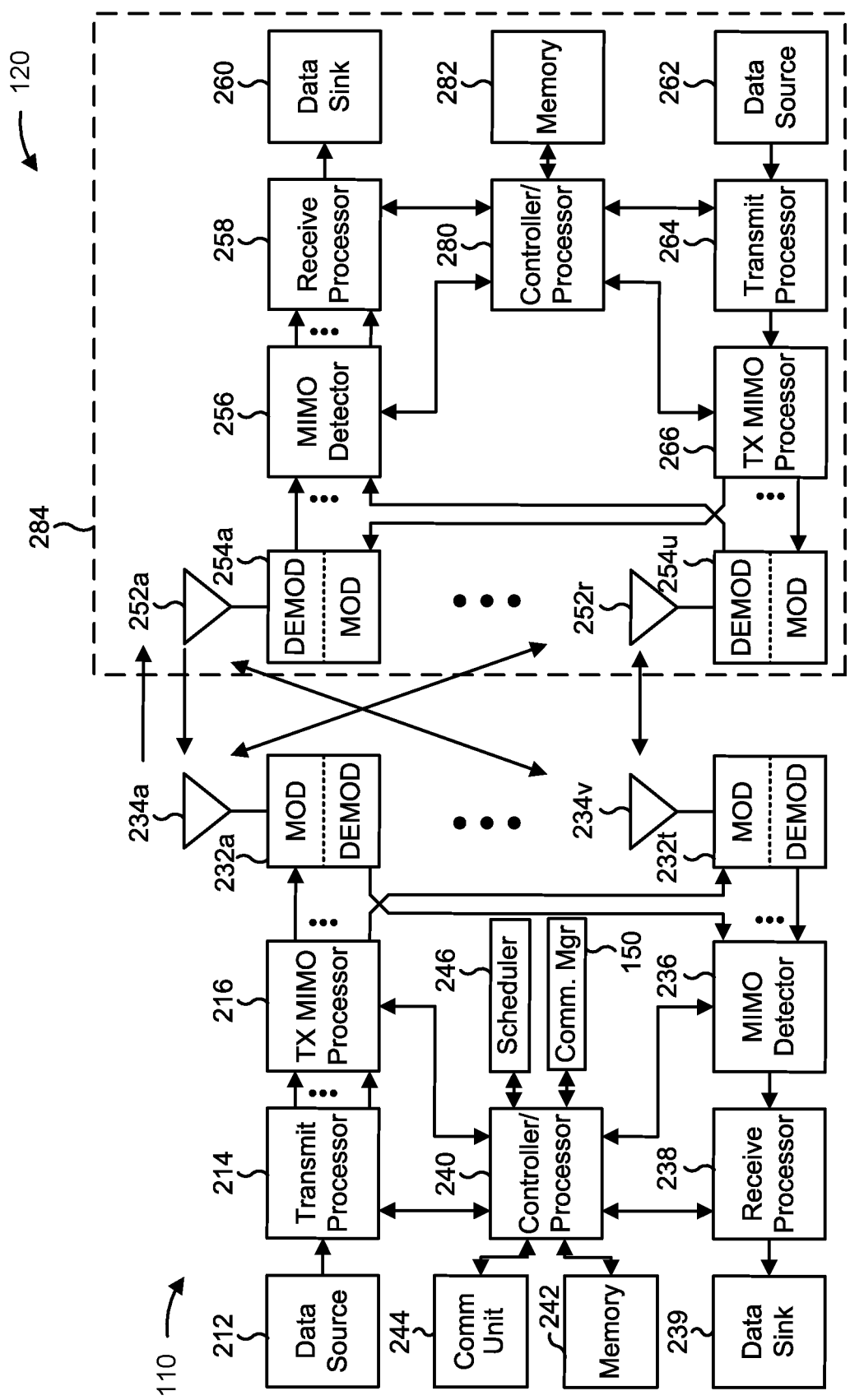
FIG. 2 is a diagram illustrating an example network node in communication with an example user equipment (UE) in a wireless network in accordance with the present disclosure.

FIG. 2 is a diagram illustrating an example network node 110 in communication with an example UE 120 in a wireless network in accordance with the present disclosure.

As shown in FIG. 2, the network node 110 may include a data source 212, a transmit processor 214, a transmit (TX) MIMO processor 216, a set of modems 232 (shown as 232a through 232t, where t≥1), a set of antennas 234 (shown as 234a through 234v, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232a through 232t may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252a through 252r, where r≥1), a set of modems 254 (shown as modems 254a through 254u, where u≥1), a MIMO detector 256, a receive processor 258, a data sink 260, a data source 262, a transmit processor 264, a TX MIMO processor 266, a controller/processor 280, and/or a memory 282, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a channel quality indicator (CQI) parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink SRS, and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254a through 254u may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

Figure 3:
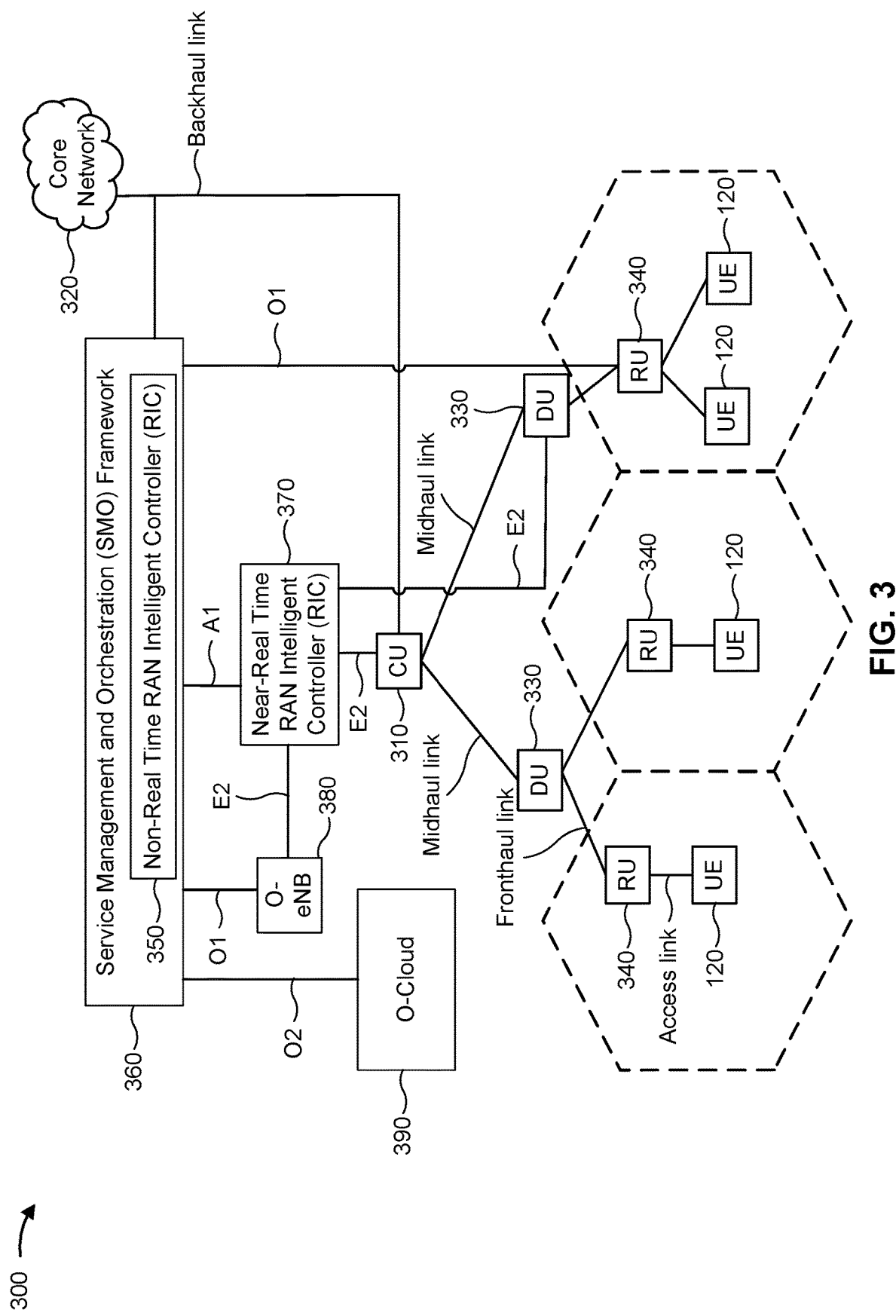
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUS 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU-UP units and one or more CU-CP units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, artificial intelligence and/or machine learning (AI/ML) workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

As indicated above, FIG. 3 is provided as an example. Other examples may differ from what is described with regard to FIG. 3.

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with a RIS codebook, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of, for example, process 1600 of FIG. 16, process 1700 of FIG. 17, or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 1600 of FIG. 16, process 1700 of FIG. 17, or other processes as described herein. In some examples, executing instructions may include running the instructions, converting the instructions, compiling the instructions, and/or interpreting the instructions, among other examples. In some aspects, the network entity described herein is the network node 110, is included in the network node 110, or includes one or more components of the network node 110 shown in FIG. 2.

In some aspects, the network node includes means for receiving an indication of a RIS configuration associated with a first network node and an indication of one or more RIS codebooks associated with one or more second network nodes; and/or means for transmitting, using the RIS configuration associated with the first network node, the one or more RIS codebooks associated with the one or more second network nodes, and one or more link parameters associated with the first network node, an indication of a RIS codebook containing at least one RIS configuration that is associated with the first network node and the one or more second network nodes. In some aspects, the network node includes means for receiving an indication of one or more RIS capabilities associated with a RIS that includes a plurality of RIS subarrays; and/or means for transmitting, based at least in part on the one or more RIS capabilities, an indication of a RIS codebook that contains at least one RIS configuration of one or more mechanical or material properties corresponding to one or more sets of the plurality of RIS subarrays. The means for the network node to perform operations described herein may include, for example, one or more of communication manager 150, transmit processor 214, TX MIMO processor 216, modem 232, antenna 234, MIMO detector 236, receive processor 238, controller/processor 240, memory 242, or scheduler 246.

Cellular coverage and blockage remain critical areas in telecommunications (e.g., in mmWave bands). Densely deploying network nodes or small cells to improve cellular coverage and mitigate blockages can be cost-inefficient and face backhaul and site-acquisition bottlenecks. IAB nodes and network-controlled repeaters may relieve some blockage/coverage issues, but RIS may mitigate coverage holes with a lower energy-cost footprint. A RIS includes an array of reflecting and/or refracting elements that may be used to improve cellular coverage. Having no amplification capability, a RIS may be sufficiently large to employ many such elements. As a result, RIS deployments should be carefully planned and exploited.

Figure 4:
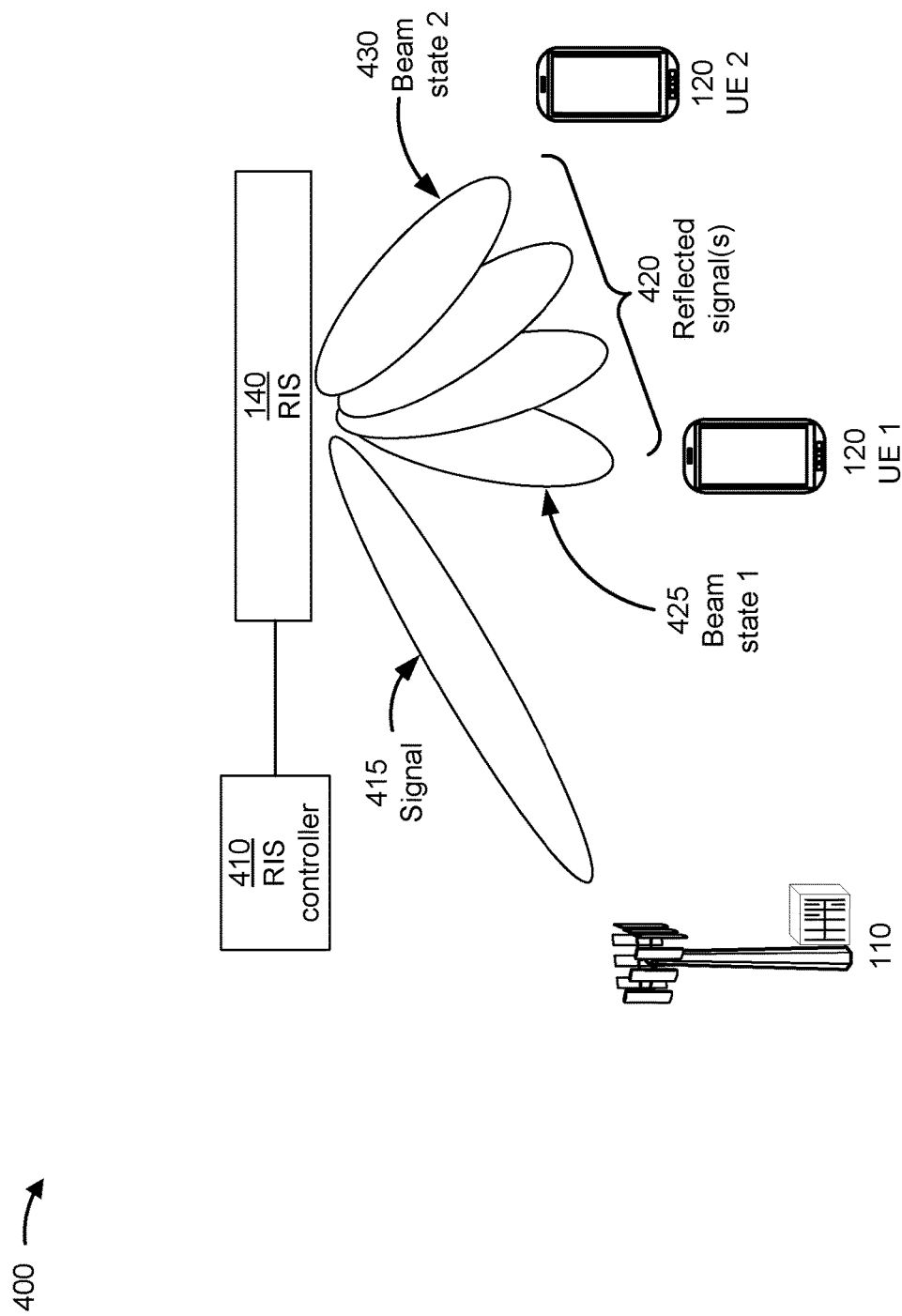
FIG. 4 is a diagram illustrating an example of communications using a reconfigurable intelligent surface (RIS), in accordance with the present disclosure.

FIG. 4 is a diagram illustrating an example 400 of communications using a RIS, in accordance with the present disclosure. As shown in FIG. 4, a network node 110 may communicate with a UE 120 in a wireless network, such as the wireless network 100. The network node 110 and the UE 120 may use the RIS 140 to communicate with one another. For example, the RIS 140 may reflect or redirect a signal to the network node 110 and/or the UE 120. The RIS 140 may also be referred to as an intelligent reflecting surface. In some examples, the RIS 140 may be a repeater.

The RIS 140 may be, or may include, a planar or two-dimensional structure or surface that is designed to have properties to enable a dynamic control of signals or electromagnetic waves reflected and/or redirected by the RIS 140. The RIS 140 may include one or more reconfigurable elements. For example, the RIS 140 may include an array of reconfigurable elements (e.g., an array of uniformly distributed reconfigurable elements). The reconfigurable elements may be elements with a reconfigurable electromagnetic characteristic. For example, the electromagnetic characteristic may include a reflection characteristic (e.g., a reflection coefficient), a scattering characteristic, an absorption characteristic, and/or a diffraction characteristic. The electromagnetic characteristic(s) of each reconfigurable element may be independently controlled and changed over time. The electromagnetic characteristic(s) of each reconfigurable element may be independently configured such that the combination of configured states of the reconfigurable elements reflects an incident signal or waveform in a controlled manner. For example, the reconfigurable elements may be configured to reflect or redirect an impinging signal in a controlled manner, such as by reflecting the impinging signal in a desired direction, with a desired beam width, with a desired phase, with a desired amplitude, and/or with a desired polarization, among other examples. In other words, the RIS 140 may be capable of modifying one or more properties (e.g., direction, beam width, phase, amplitude, and/or polarization) of an impinging signal.

The reconfigurable elements of the RIS 140 may be controlled and/or configured by a RIS controller 410. The RIS controller 410 may be a control module (e.g., a controller and/or a processor) that is capable of configuring the electromagnetic characteristic(s) of each reconfigurable element of the RIS 140. The RIS controller 410 may be associated with certain components similar to the components described in connection with the UE 120 in connection with FIG. 2, such as a modem 254 and/or a similar component for purposes of communicating with a network node 110. The RIS controller 410 may receive control communications (e.g., from a network node 110 and/or a UE 120) indicating one or more properties of reflected signals (e.g., indicating a desired direction, a desired beam width, a desired phase, a desired amplitude, and/or a desired polarization). Therefore, in some examples, the RIS 140 may be capable of receiving communications (e.g., via the RIS 140 and/or the RIS controller 410). In some examples, the RIS 140 and/or the RIS controller 410 may not have transmit capabilities (e.g., the RIS 140 may be capable of reflecting and/or redirecting impinging signals via the reconfigurable elements, but may not be capable of generating and/or transmitting signals). Alternatively, in some examples, the RIS 140 and/or the RIS controller 410 may have transmit capabilities (e.g., the RIS 140 may be capable of reflecting and/or redirecting impinging signals via the reconfigurable elements and may be capable of generating and/or transmitting signals). For example, the RIS 140 and/or the RIS controller 410 may include one or more antennas and/or antenna elements for receiving and/or transmitting signals.

For example, as shown in FIG. 4, the network node 110 may transmit a signal 415. The signal 415 may be transmitted in a spatial direction toward the RIS 140. The RIS 140 may configure the reconfigurable elements of the RIS 140 to reflect and/or redirect the signal 415 in a desired spatial direction and/or with one or more desired signal characteristics (e.g., beam width, phase, amplitude, frequency, and/or polarization). For example, as shown by reference number 420, the RIS 140 may be capable of reflecting the signal 415 in one or more spatial directions. Although multiple beams are shown in FIG. 4 representing different beam states or beam directions of the RIS 140, the RIS 140 may be capable of reflecting a signal with one beam state or one beam direction at a time. For example, in one case, as shown by reference number 425, the RIS 140 may be configured to reflect the signal 415 using a first beam state (e.g., beam state 1). "Beam state" may refer to a spatial direction and/or a beam of a reflected signal (e.g., a signal reflected by the RIS 140). The first beam state may cause the signal 415 to be reflected in a spatial direction toward a first UE 120 (e.g., UE 1). As shown by reference number 430, in another case, the RIS 140 may be configured to reflect the signal 415 using a second beam state (e.g., beam state 2). The second beam state may cause the signal 415 to be reflected in a spatial direction toward a second UE 120 (e.g., UE 2).

The RIS 140 may be deployed in a wireless network (such as the wireless network 100) to improve communication performance and efficiency. For example, the RIS 140 may enable a transmitter (e.g., a network node 110 or a UE 120) to control the scattering, reflection, and refraction characteristics of signals transmitted by the transmitter, to overcome the negative effects of wireless propagation. For example, the RIS 140 may effectively control signal characteristics (e.g., spatial direction, beam width, phase, amplitude, frequency, and/or polarization) of an impinging signal without a need for complex decoding, encoding, and radio frequency processing operations. Therefore, the RIS 140 may provide increased channel diversity for propagation of signals in a wireless network. The increased channel diversity provides robustness to channel fading and/or blocking, such as when higher frequencies are used by the network node 110 and/or the UE 120 (e.g., millimeter wave frequencies and/or sub-terahertz frequencies). Moreover, as the RIS 140 does not need to perform complex decoding, encoding, and radio frequency processing operations, the RIS 140 may provide a more cost and energy efficient manner of reflecting and/or redirecting signals in a wireless network (e.g., as compared to other mechanisms for reflecting and/or redirecting signals, such as a relay device).

As indicated above, FIG. 4 is provided as an example. Other examples may differ from what is described with respect to FIG. 4.

Figure 5:
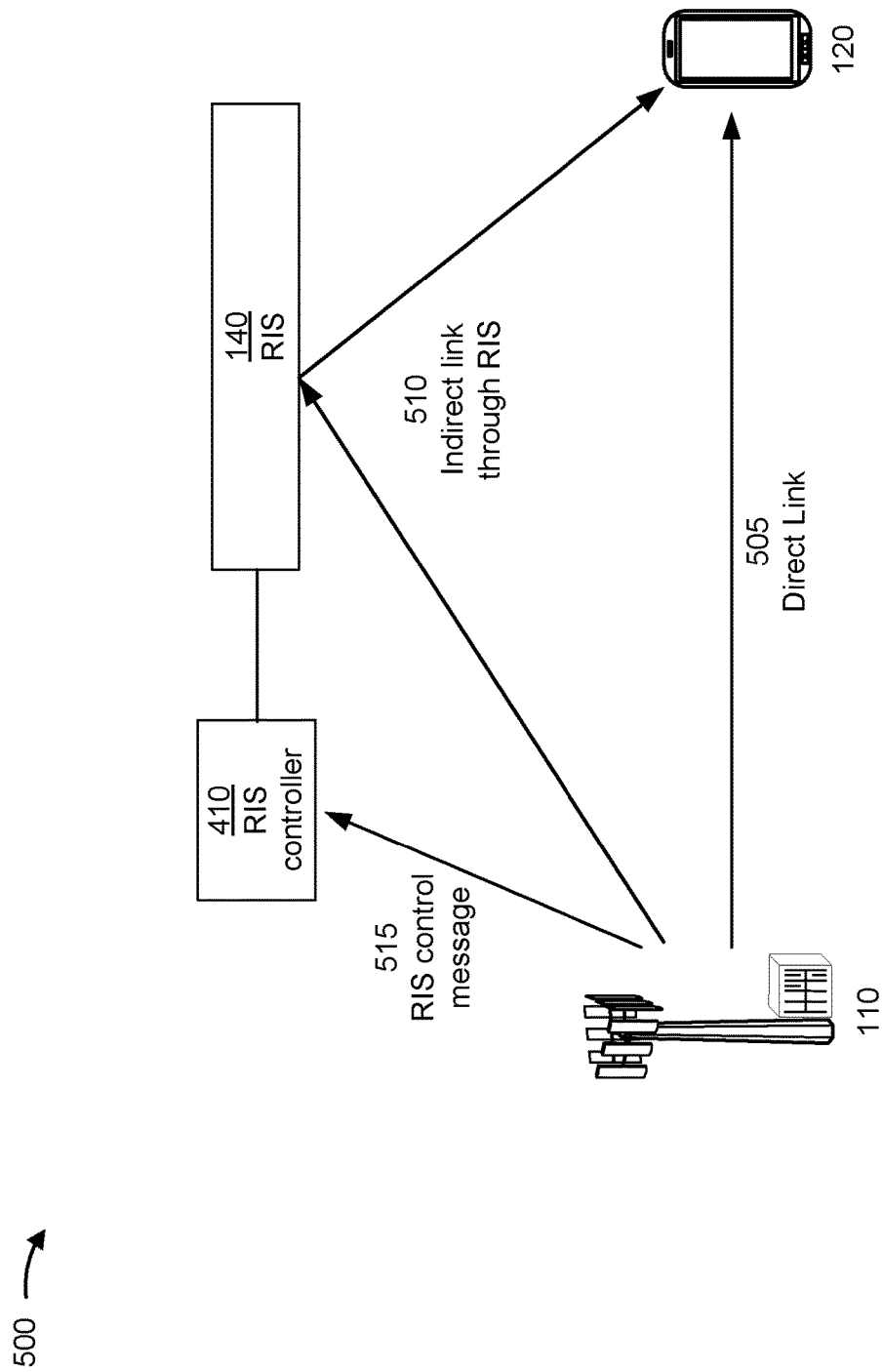
FIG. 5 is a diagram illustrating an example of communication links in a wireless network that includes a RIS, in accordance with the present disclosure.

FIG. 5 is a diagram illustrating an example 500 of communication links in a wireless network that includes a RIS, in accordance with the present disclosure. As shown, example 500 includes a network node 110, a UE 120, and the RIS 140. The RIS 140 may be controlled and/or configured by the RIS controller 410.

As shown in FIG. 5, the UE 120 may receive a communication (e.g., data and/or control information) directly from the network node 110 as a downlink communication. Additionally, or alternatively, the UE 120 may receive a communication (e.g., data and/or control information) indirectly from the network node 110 via the RIS 140. For example, the network node 110 may transmit the communication in a spatial direction toward the RIS 140, and the RIS 140 may redirect or reflect the communication to the UE 120.

In some examples, the UE 120 may communicate directly with the network node 110 via a direct link 505. For example, a communication may be transmitted via the direct link 505. A communication transmitted via the direct link 505 between the UE 120 and the network node 110 does not pass through and is not reflected or redirected by the RIS 140. In some examples, the UE 120 may communicate indirectly with the network node 110 via an indirect link 510. For example, a communication may be transmitted via different segments of the indirect link 510. A communication transmitted via the indirect link 510 between the UE 120 and the network node 110 is reflected and/or redirected by the RIS 140. As shown in FIG. 5 and by reference number 515, the network node 110 may communicate with the RIS 140 (e.g., with the RIS controller 410) via a control channel. For example, the network node 110 may indicate, in a RIS control message, spatial direction(s) and/or signal characteristics for signals reflected by the RIS 140. The RIS controller 410 may configure reconfigurable elements of the RIS 140 in accordance with the RIS control message. In some examples, the RIS control message may indicate information associated with the wireless network, such as a frame structure, time synchronization information, and/or slot boundaries, among other examples. Using the communication scheme shown in FIG. 5 may improve network performance and increase reliability by providing the UE 120 with link diversity for communicating with the network node 110.

In some cases, the UE 120 may receive a communication (e.g., the same communication) from the network node 110 via both the direct link 505 and the indirect link 510. In other cases, the network node 110 may select one of the links (e.g., either the direct link 505 or the indirect link 510) and may transmit a communication to the UE 120 using only the selected link. Alternatively, the network node 110 may receive an indication of one of the links (e.g., either the direct link 505 or the indirect link 510), and may transmit a communication to the UE 120 using only the indicated link. The indication may be transmitted by the UE 120 and/or the RIS 140. In some examples, such selection and/or indication may be based at least in part on channel conditions and/or link reliability.

As indicated above, FIG. 5 is provided as an example. Other examples may differ from what is described with respect to FIG. 5.

Figure 6:
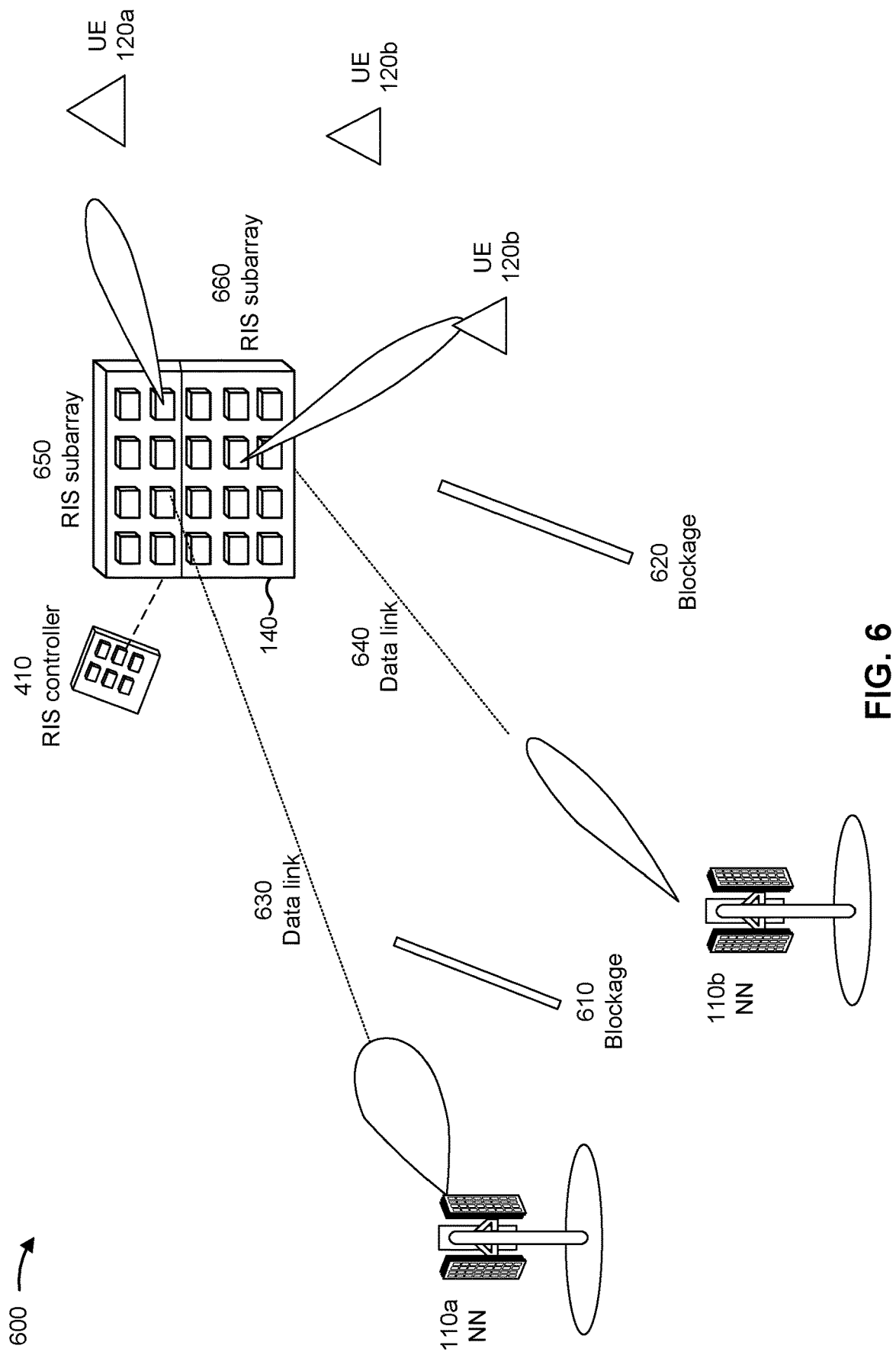
FIG. 6 is a diagram illustrating an example of a RIS configured to assist multiple network nodes using RIS subarrays, in accordance with the present disclosure.

FIG. 6 is a diagram illustrating an example 600 of a RIS configured to assist multiple network nodes using RIS subarrays, in accordance with the present disclosure. As shown, example 600 includes network nodes 110a and 110b, UEs 120a and 120b, and the RIS 140. The RIS 140 may be controlled and/or configured by the RIS controller 410.

A blockage 610 may block a direct communication path between the network node 110a and the UE 120a. Accordingly, the network node 110a may establish a data link 630 (e.g., an indirect link) with the UE 120a via the RIS 140, which may enable communications between the network node 110a and the UE 120a. Similarly, a blockage 620 may block a direct communication path between the network node 110b and the UE 120b, and the network node 110b may establish a data link 640 (e.g., an indirect link) with the UE 120b via the RIS 140, which may enable communications between the network node 110b and the UE 120b. The data link 630 and the data link 640 may be associated with different frequencies. As shown, the UE 120b may change locations over time.

In some examples, the RIS 140 may have a RIS array that is partitioned into RIS subarray 650 and RIS subarray 660. RIS subarray 650 may be controlled by network node 110a, and RIS subarray 660 may be controlled by network node 110b. The partitioning of the RIS array into RIS subarray 650 and RIS subarray 660 may be fixed or static (e.g., fixed in time). Fixed partitioning may be suboptimal due to loss in directivity, poor handling of cross-link interference (CLI), or the like. For example, fixed partitioning into equal subarrays corresponding to respective data links 630 and 640 may lead to a loss in directivity, such as a 6 dB gain loss for each data link 630 and 640 (e.g., each data link 630 and 640 may be 6 dB below respective single-data-link RIS configuration gains). Additionally, or alternatively, fixed partitioning can result in poor CLI handling, such as scenarios where the RIS subarray 650 (or the RIS subarray 660) reflects signals transmitted by the network node 110a (or the network node 110b) toward unintended UEs.

As indicated above, FIG. 6 is provided as an example. Other examples may differ from what is described with respect to FIG. 6.

Figure 7:
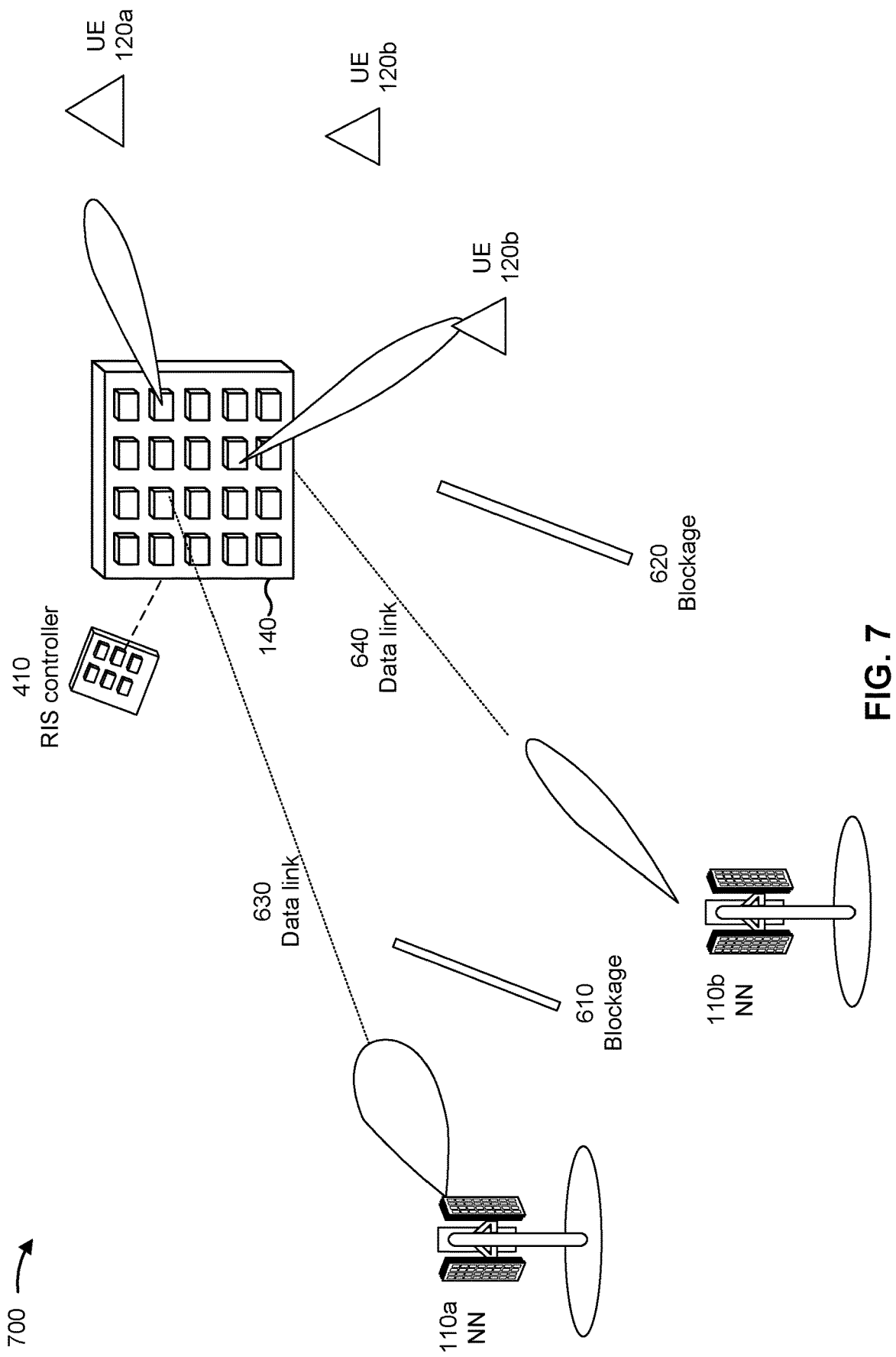
FIG. 7 is a diagram illustrating an example of a RIS configured to assist multiple network nodes using time-division multiplexing (TDM), in accordance with the present disclosure.

FIG. 7 is a diagram illustrating an example 700 of a RIS configured to assist multiple network nodes using time-division multiplexing (TDM), in accordance with the present disclosure. As shown, example 600 includes network nodes 110a and 110b, UEs 120a and 120b, RIS 140, RIS controller 410, and blockages 610 and 620, and data links 630 and 640.

In example 700, rather than being partitioned into RIS subarrays (as in example 600), the RIS 140 is partitioned on a TDM-basis (e.g., the RIS 140 may be used by network nodes 110a and network nodes 110b in a TDM-based deployment). For example, the network nodes 110a and 110b may use the RIS 140 during respective sets of time-domain resources. Although TDM-based partitioning enables each network node 110a and 110b to achieve high gains and avoid CLI, TDM-based partitioning may nonetheless be sub-optimal.

For example, the RIS 140 may provide assistance to each network node 110a and 110b intermittently, and a time schedule to determine which of network nodes 110a and 110b is assisted by the RIS 140 at a given time interval may be determined in advance, thereby limiting system agility to adapt to dynamic traffic. Thus, using the RIS 140 in TDM fashion may reduce spectral efficiency achieved for each network node by half while limiting flexibility. Additionally, or alternatively, TDM-based partitioning may entail frequent RIS reconfiguration, which may incur associated RIS reconfiguration downtime and increase power consumed by the RIS 140. Power at the RIS 140 may be a scarce resource (e.g., compared to the power at network node 110a or network node 110b). Moreover, reconfiguring (e.g., retuning) electronic components within each RIS subarray may entail circuit complexity. Maintaining an electronic state (e.g., states of all constituent electronic components) may also consume power.

As indicated above, FIG. 7 is provided as an example. Other examples may differ from what is described with respect to FIG. 7.

Figure 8:
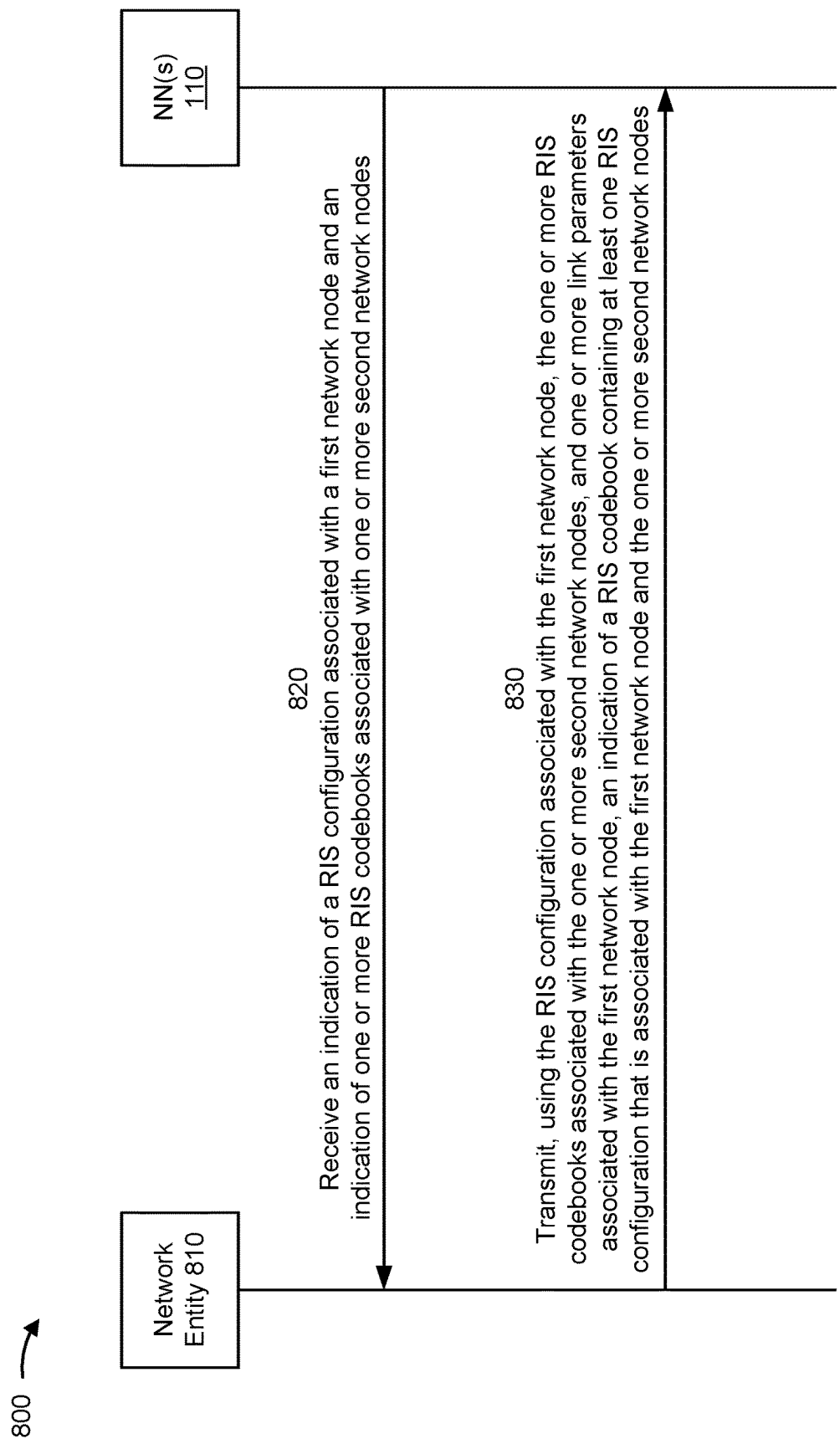
FIG. 8 is a diagram illustrating an example associated with a dual-tasked codebook, in accordance with the present disclosure.

FIG. 8 is a diagram illustrating an example 800 associated with a dual-tasked codebook, in accordance with the present disclosure. As shown in FIG. 8, a network entity 810 and one or more network nodes 110 may communicate with one another. The network entity 810 may be any suitable entity, such as a master network node, a network node in communication with a UE 120 via a RIS, a CU, a third-party device (e.g., an operations, administration, and maintenance (OAM) server), a third-party RIS manager, or the like.

As shown by reference number 820, the network entity 810 may receive an indication of a RIS configuration associated with a first network node 110. A RIS configuration may configure a RIS (e.g., RIS 140) with a pattern. For example, the pattern may be a pattern of voltage values that can be applied to respective elements of the RIS. A voltage value may correspond to a phase shift that the element imposes on an incident signal. Thus, once configured with a pattern, the RIS may apply the pattern and reflect or refract an incident signal in a direction based at least in part on the direction of the incident signal and the pattern (e.g., and not based on another incident signal). The RIS configuration may be associated with the first network node 110 in that the RIS configuration may cause the RIS to apply a pattern of voltage values to respective elements of the RIS that enables the first network node 110 to communicate with a UE.

As further shown by reference number 820, the network entity 810 may receive an indication of one or more RIS codebooks associated with one or more second network nodes 110. A RIS codebook may be a set of RIS configurations capable of causing the RIS to apply respective patterns. In some examples, a RIS configuration may be referred to as a codeword (e.g., a RIS codebook may contain multiple RIS codewords). The one or more RIS codebooks may be associated with one or more second network nodes 110 in that the one or more RIS codebooks may contain sets of one or more RIS configurations that cause the RIS to apply one or more patterns of voltage values to respective elements of the RIS that enable the one or more second network nodes 110 to communicate with one or more UEs.

The RIS configuration associated with the first network node 110 may be a baseline RIS configuration capable of assisting the first network node 110 in communications with a UE. The one or more RIS codebooks associated with the one or more second network nodes 110 may be one or more default RIS codebooks capable of assisting the one or more second network nodes 110 in communications with one or more other UEs (e.g., the one or more RIS codebooks may be one or more single-objective RIS codebooks). In some examples, the network entity may identify the RIS configuration and/or the one or more RIS codebooks based at least in part on explicit estimates of relevant directions and distances (e.g., leveraging positioning-based methods). In some examples, the network entity may identify the RIS configuration and/or the one or more RIS codebooks based at least in part on synchronization signal block (SSB) transmission-based training schemes. For instance, a network node may transmit pilot signals that are reflected or refracted by the RIS under respective configurations and measured by one or more receivers in a target coverage region. The one or more receivers may convey the measurements (e.g., signal strengths) to network node and/or the network entity. The measured reflected or refracted signal strengths may provide information associated with pointing directions under different RIS configurations. This information may be further refined via training using hierarchical (e.g., broad-to-narrow) RIS reflect or refract beams.

As shown by reference number 830, the network entity 810 may transmit, using the RIS configuration associated with the first network node, the one or more RIS codebooks associated with the one or more second network nodes, and one or more link parameters associated with the first network node, an indication of a RIS codebook containing at least one RIS configuration that is associated with the first network node and the one or more second network nodes. The at least one RIS configuration may be associated with the first network node and the one or more second network nodes in that the at least one RIS configuration may cause the RIS to apply a pattern of voltage values to respective elements of the RIS that simultaneously enables the first network node 110 to communicate with a UE in accordance with the one or more link parameters and the one or more second network nodes 110 to communicate with one or more other UEs. In this sense, the RIS codebook may be referred to as a dual-tasked codebook. Each RIS configuration in the dual-tasked codebook (e.g., each of the at least one RIS configuration) may correspond to a given set of control signals that are applied on RIS constituent electronic components (e.g., voltage levels on diodes), which can control phase shift.

For example, every pattern configurable by the at least one RIS configuration in the RIS codebook may achieve strong anomalous reflection or refraction for at least two tuples. In some examples, each tuple may specify a pair of (incident, reflect/refract) directions. One tuple may be common across all patterns (e.g., RIS configurations) in the codebook, which may enable the first network node 110 to provide fixed, or semi-statically varying, coverage of a given spot via the RIS. Another tuple may vary across patterns in the codebook, which may enable the one or more second network nodes 110 to provide dynamic coverage for served users via the RIS.

The RIS codebook may comply with the one or more link parameters. The network entity 810 may obtain (e.g., identify) the one or more link parameters based at least in part on any suitable factor(s). In some aspects, the one or more link parameters include a signal gain associated with the RIS configuration associated with the first network node 110. The signal gain may be associated with the RIS configuration associated with the first network node in that the signal gain may be a gain for a target signal obtained during a period of time in which the RIS is configured with the RIS configuration associated with the first network node 110 and assisting only a data link of the first network node 110. For example, the dual-tasked codebook may ensure a minimum specified gain for the data link of the first network node 110 and a minimum performance for the one or more data links of the one or more second network nodes 110.

In some aspects, the one or more link parameters include a signal gain threshold associated with the first network node 110. The signal gain threshold may be associated with the first network node 110 in that the signal gain threshold may be an acceptable drop (e.g., an available margin) in a target signal gain of the data link of the first network node 110 upon the RIS providing simultaneous assistance to one or more data links of the one or more second network nodes 110. The acceptable drop may be compared to a gain that is obtained during a period of time in which the RIS is configured with the RIS configuration associated with the first network node 110 and assisting only the data link of the first network node 110.

In some aspects, the one or more link parameters include a main lobe width associated with the first network node 110. The main lobe width may be associated with the first network node 110 in that the main lobe width may be a minimum required reflect/refract beam main lobe width for communications involving the first network node 110.

In some aspects, the one or more link parameters may include an interference threshold associated with the first network node 110. The interference threshold may be associated with the first network node 110 in that the interference threshold may be a tolerable amount of interference from data links involving the RIS that simultaneously co-exist with the data link of the first network node 110, such as the one or more data links of the one or more second network nodes 110.

Transmitting the indication of the RIS codebook may involve configuring the RIS codebook (which may comply with the one or more link parameters) for a RIS controller, such as a RIS mobile termination (RIS-MT), and the one or more second network nodes 110. The network entity 810 may configure the RIS codebook with one or more additional fields. In some aspects, the network entity 810 may transmit an indication of one or more associations between the RIS codebook and the one or more RIS codebooks associated with the one or more second network nodes 110. For example, the additional field(s) may specify one or more spatial-quasi-co-location-type associations of the RIS codebook with the one or more RIS codebooks associated with the one or more second network nodes 110. In some aspects, the network entity 810 may an indication of at least one association between the at least one RIS configuration associated with the first network node 110 and the one or more second network nodes 110 and at least one RIS configuration contained in the one or more RIS codebooks associated with the one or more second network nodes 110. For example, the additional field(s) may specify an association of codewords (e.g., RIS patterns) between the at least one RIS configuration associated with the first network node 110 and the one or more second network nodes 110 and at least one RIS configuration contained in the one or more RIS codebooks associated with the one or more second network nodes 110. The association may indicate that RIS reflect/refract beam pointing directions (e.g., for one or more incident signals from the one or more network nodes 110) of the respective at least one RIS configurations are similar (e.g., that the RIS reflect/refract beam pointing directions are aligned to within a specified angular threshold).

In some aspects, the network entity 810 may receive an indication of one or more updated link parameters. For example, the first network node 110 may signal, to the network entity 810, a change in the one or more link parameters. The first network node 110 may signal the change in an event-driven manner. For example, the first network node 110 may signal the change based at least in part on a change in a target reflect/refract direction, a change in a margin specifying a drop in a target reflected/refracted signal gain or an acceptable interference level, or the like.

In some aspects, the network entity 810 may transmit, based at least in part on the one or more updated link parameters, an indication of an updated RIS codebook containing at least one updated RIS configuration that is associated with the first network node 110 and the one or more second network nodes 110. For example, in response to receiving the indication of the one or more updated link parameters, the network entity 810 may configure an updated dual-task codebook, for the one or more second network nodes 110 and the RIS-MT, which is compliant with the one or more updated link parameters.

In some aspects, the network entity 810 may transmit a RIS configuration associated with RIS sub-arrays. For example, the network entity 810 may fallback to (e.g., by configuring) a RIS operation scheme that is based at least in part on fixed (e.g., static) sub-array partitioning. The static-partitioning-based-scheme may involve implementations described herein, such as implementations that enable unrestricted RIS assistance for either network node based at least in part on a mechanical-material reconfiguration (e.g., as described below in connection with FIGS. 12-15). The network entity 810 may fallback to the static-partitioning-based-scheme in response to any suitable trigger event. For example, the network entity 810 may receive the indication of the one or more updated link parameters. Additionally, or alternatively, the first network node 110 may require a faster data link reconfiguration rate and, therefore, request a switch to the static-partitioning-based-scheme via a fallback request signaling mechanism. Additionally, or alternatively, the one or more second network nodes may require higher gain and, therefore, transmit a fallback request for TDM-based operation. The network entity 810 may accept or reject a request to fallback to a different scheme or operation from a network node.

In some aspects, the network entity 810 may transmit an indication of a link parameter updating rate threshold or a RIS codebook updating rate threshold. The link parameter updating rate threshold may limit a rate at which the one or more link parameters can be updated, and the RIS codebook updating rate threshold may limit a rate at which the RIS codebook can be updated. For example, the link parameter updating rate threshold and/or the RIS codebook updating rate threshold may limit a reconfiguration (or change) rate of a data link of the first network node 110, which may cause a minimum time gap to be maintained between successive updates of the RIS codebook. In some examples, the network entity 810 may assign pre-configured frame-boundaries (change-points in time) at which network node 110 is permitted to update the one or more link parameters and/or at which the RIS codebook can be updated. Thus, the link parameter updating rate threshold and/or the RIS codebook updating rate threshold may limit the change-rate of attributes of the first network node 110 and/or allow such changes at only pre-configured time instances.

In some aspects, the network entity 810 may transmit a frequency division multiplexing (FDM) configuration associated with the first network node 110 and the one or more second network nodes 110. The FDM configuration may (e.g., partially) frequency-division-multiplex the data link associated with the first network node 110 and the data link associated with the one or more second network nodes 110. For example, the FDM configuration may enable frequency resource partitioning (or partial overlapping) among the first network node 110 and the one or more second network nodes 110.

In some aspects, the at least one RIS configuration may be associated with reflection or refraction of an incident signal. The at least one RIS configuration may be associated with the reflection or refraction of the incident signal in that the at least one RIS configuration may cause the RIS to reflect or refract an incident signal. The incident signal may be transmitted from a transmitter, such as a network node, a UE, or the like. The incident signal may be reflected or refracted toward a receiver, such as a network node, a UE, or the like. In a case where the incident signal is transmitted from a network node and toward a UE, the incident signal may carry a downlink transmission. In a case where the incident signal is transmitted from a UE and toward a network node, the incident signal may carry an uplink transmission.

As indicated above, FIG. 8 is provided as an example. Other examples may differ from what is described with respect to FIG. 8.

Figure 9:
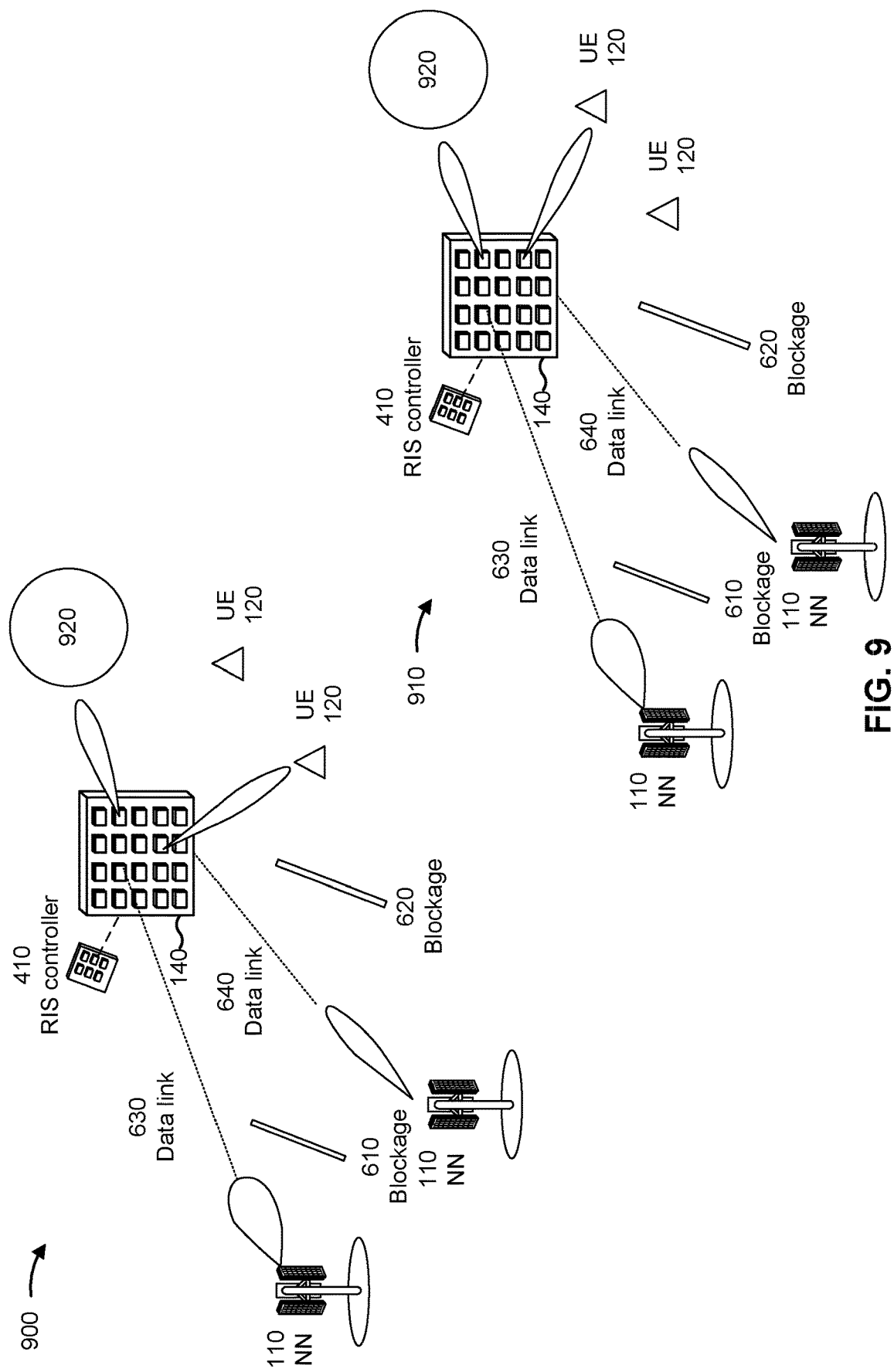
FIG. 9 is a diagram illustrating examples of a RIS configured to simultaneously assisting multiple network nodes using a dual-tasked codebook, in accordance with the present disclosure.

FIG. 9 is a diagram illustrating examples 900 and 910 of a RIS configured to simultaneously assisting multiple network nodes using a dual-tasked codebook, in accordance with the present disclosure. As shown, examples 900 and 910 include network nodes 110, UEs 120, RIS 140, RIS controller 410, and blockages 610 and 620, and data links 630 and 640. The RIS 140 may be configured with at least one RIS configuration of the RIS codebook (e.g., the dual-tasked codebook). In some examples, the RIS 140 may not be partitioned into multiple subarrays that assist different network nodes and may not be used in a TDM manner.

As shown in example 900, at a first time, the RIS 140 may assist a first network node 110 in serving a coverage spot 920 and a second network node 110 in serving a first UE 120. As shown in example 910, at a second time, the RIS 140 may assist a first network node 110 in serving a coverage spot 920 and a second network node 110 in serving a second UE 120. Thus, for the first network node 110, the RIS 140 may provide a relatively constant or static coverage of the coverage spot 920 by reflecting or refracting an incident signal from the first network node 110 toward the coverage spot 920.

For the first network node 110, the RIS 140 may assist multiple UEs 120 served by the network node 110 by reflecting or refracting an incident signal from the second network node 110 toward the UEs 120. For example, the RIS 140 may assist the first and second UEs 120 by dynamically changing between RIS configurations from the RIS codebook. Under each selected RIS configuration (e.g., dual-tasked configuration), the RIS 140 may maintain a minimum gain towards the coverage spot 920 for the incident signal from the first network node 110 while reflecting or refracting the incident signal from the second network node 110 with a higher gain toward a selected UE 120.

As indicated above, FIG. 9 is provided as an example. Other examples may differ from what is described with respect to FIG. 9.

Figure 10:
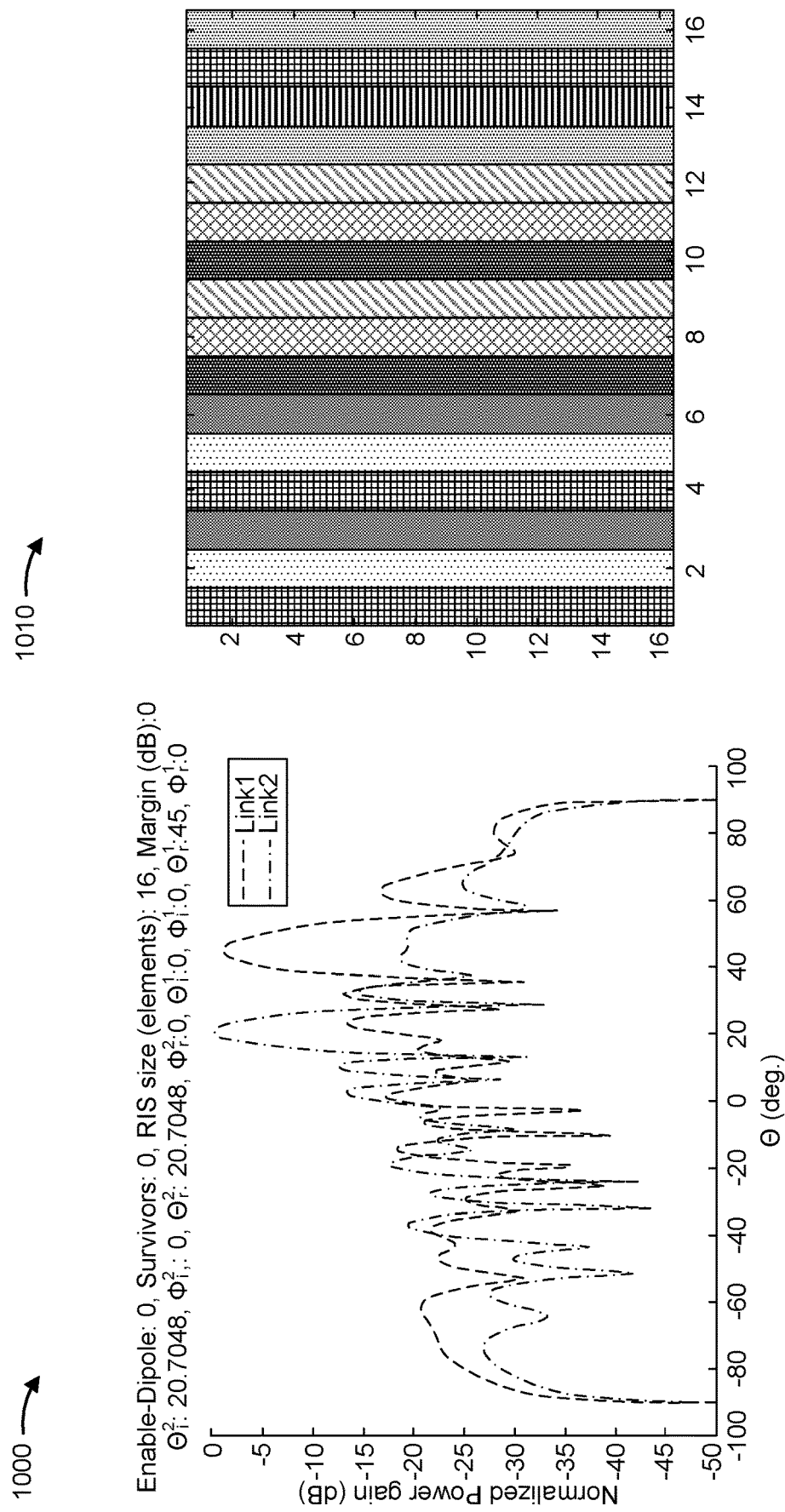
FIG. 10 is a diagram illustrating examples of first simulation results involving a 16-by-16 RIS using a 3-bit reflection coefficient alphabet for 8 phase-shift keying (8-PSK), in accordance with the present disclosure.

FIG. 10 is a diagram illustrating examples 1000 and 1010 of first simulation results involving a 16-by-16 RIS using a 3-bit reflection coefficient alphabet for 8 phase-shift keying (8-PSK), in accordance with the present disclosure.

Example 1000 illustrates a normalized power gain for a first data link ("Link 1") and a second data link ("Link 2"). The first and second data links may associated with respective network nodes and may be assisted by the RIS simultaneously. Link 1 has an incident direction of $\theta_i^1=0$, $\phi_i^1=0$ and a reflect direction of $\theta_r^1=45$, $\phi_r^1=0$ that is to be maintained within a given margin of 0 dB of its single-link gain. A network entity may provision for Link 2, which has an incident direction of $\theta_i^2=20.7048$, $\phi_i^2=0$, with a reflect direction of $\theta_r^2=20.7048$, $\phi_r^2=0$, thereby maximizing the gain of Link 2 while complying with the restraint that Link 1 is to be maintained within a margin of 0 dB.

Example 1010 illustrates an example RIS 3-bit codeword from the dual-tasked codebook. More specifically, example 1010 illustrates a pattern on the 16-by-16 RIS, which contains 256 RIS elements. As shown, each RIS element may be electronically configured to impart an 8-PSK phase shift to the reflected signal(s). For example, each element may be configured with one out of eight possible phase shift values (e.g., one out of eight possible voltage values, corresponding to respective phase shift values, may be imposed on each element). The hatching represents the phase shift value that each element imposes on the incident signal. The RIS configuration that results in the pattern shown in example 1010 (e.g., where all elements of a column of the RIS array have the same phase shift value imposed thereon) enables the Link 1 signal to be reflected from of $\theta_i^1=0$, $\phi_i^1=0$ to $\theta_r^1=45$, $\phi_r^1=0$ and the Link 2 signal to be reflected from $\theta_i^2=20.7048$, $\phi_i^2=0$ to $\theta_r^2=20.7048$, $\phi_r^2?=0$.

In examples 1000 and 1010, the optimal pattern for Link 1 may also be the optimal pattern for Link 2. For example, using the dual-tasked codebook, Link 1 loss relative to a single-link configuration for Link 1 is 0 dB, and Link 1 may have a signal-to-noise ratio of 18.18 dB. Similarly, using the dual-tasked codebook, Link 2 loss relative to a single-link configuration for Link 2 is 0 dB, and the Link 2 may have a signal-to-noise ratio of 15.97 dB.

As indicated above, FIG. 10 is provided as an example. Other examples may differ from what is described with respect to FIG. 10.

Figure 11:
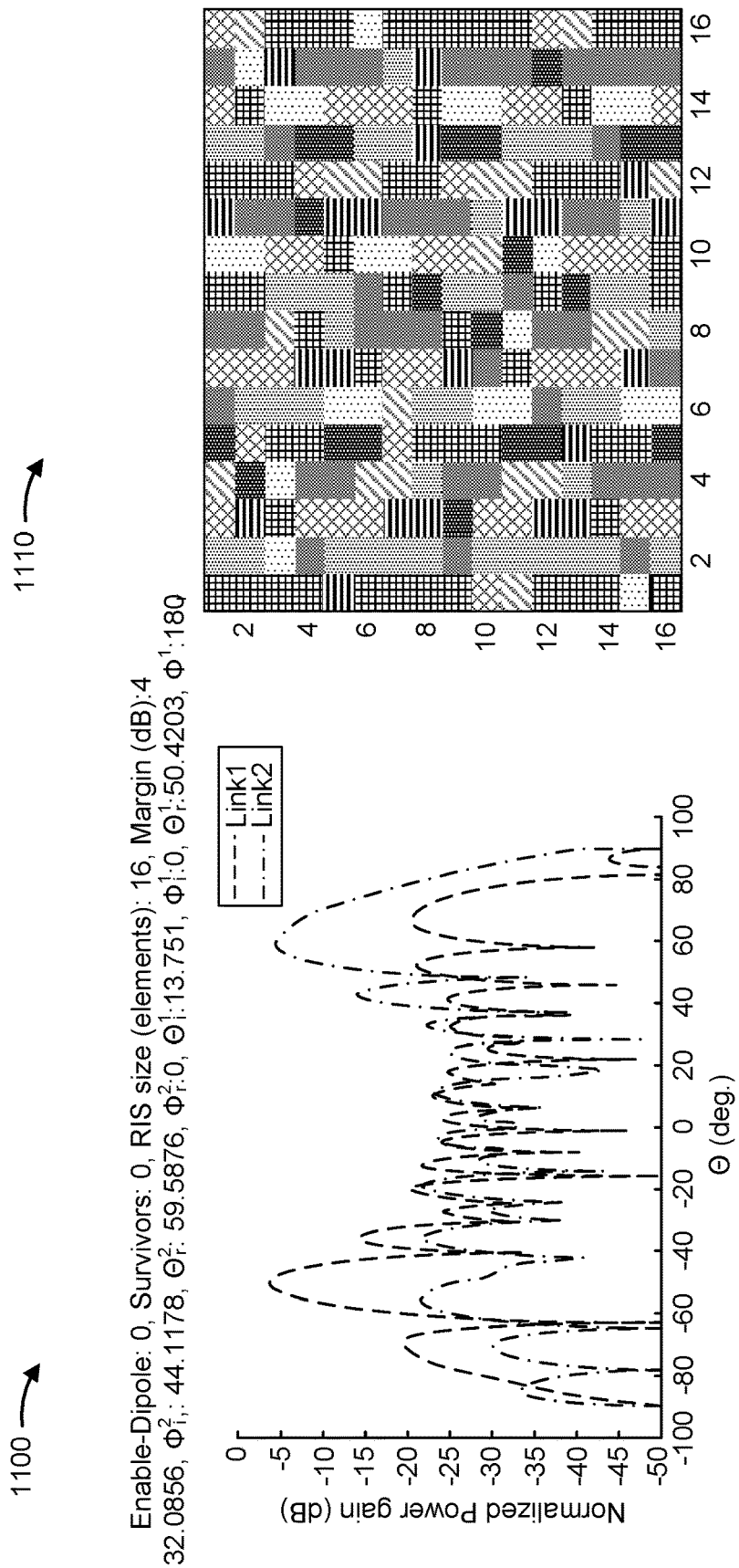
FIG. 11 is a diagram illustrating examples of second simulation results involving a 16-by-16 RIS using a 3-bit reflection coefficient alphabet for 8-PSK, in accordance with the present disclosure.

FIG. 11 is a diagram illustrating examples 1100 and 1110 of second simulation results involving a 16-by-16 RIS using a 3-bit reflection coefficient alphabet for 8-PSK, in accordance with the present disclosure.

Example 1100 illustrates a normalized power gain for a first data link ("Link 1") and a second data link ("Link 2"). The first and second data links may associated with respective network nodes and may be assisted by the RIS simultaneously. Link 1 has an incident direction of $\theta_i^1=13.75$, $\phi_i^1=0$ and a reflect direction of $\theta_r^1=50.4$, $\phi_r^1=180$ that is to be maintained within a given margin of 4 dB of its single-link gain. A network entity may provision for Link 2, which has an incident direction of $\theta_i^2=32.08$, $\phi_i^2=44.11$, with a reflect direction of $\theta_r^2=59.58$, $\phi_r^2=0$, thereby maximizing the gain of Link 2 while complying with the restraint that Link 1 is to be maintained within a margin of 4 dB.

Example 1110 illustrates an example RIS 3-bit codeword from the dual-tasked codebook. More specifically, example 1110 illustrates a pattern on the 16-by-16 RIS (256 RIS elements). As shown, each RIS element may be electronically configured to impart an 8-PSK phase shift to the reflected signal(s). For example, each element may be configured with one out of eight possible phase shift values (e.g., one out of eight possible voltage values, corresponding to respective phase shift values, may be imposed on each element). The hatching represents the phase shift value that each element imposes on the incident signal. The RIS configuration that results in the pattern shown in example 1110 enables the Link 1 signal to be reflected from $\theta_i^1=13.75$, $\phi_i^1=0$ to $\theta_r^1=50.4$, $\phi_r^1=180$ and the Link 2 signal to be reflected from $\theta_i^2=32.08$, $\phi_i^2=44.11$ to $\theta_r^2=59.58$, $\phi_r^2=0$.

Using the dual-tasked codebook, Link 1 loss relative to a single-link configuration for Link 1 is 3.99 dB, and Link 1 may have a signal-to-noise ratio of 18.85 dB. Similarly, using the dual-tasked codebook, Link 2 loss relative to a single-link configuration for Link 2 is 4.43 dB, and the Link 2 may have a signal-to-noise ratio of 42.18 dB.

As indicated above, FIG. 11 is provided as an example. Other examples may differ from what is described with respect to FIG. 11.

Figure 12:
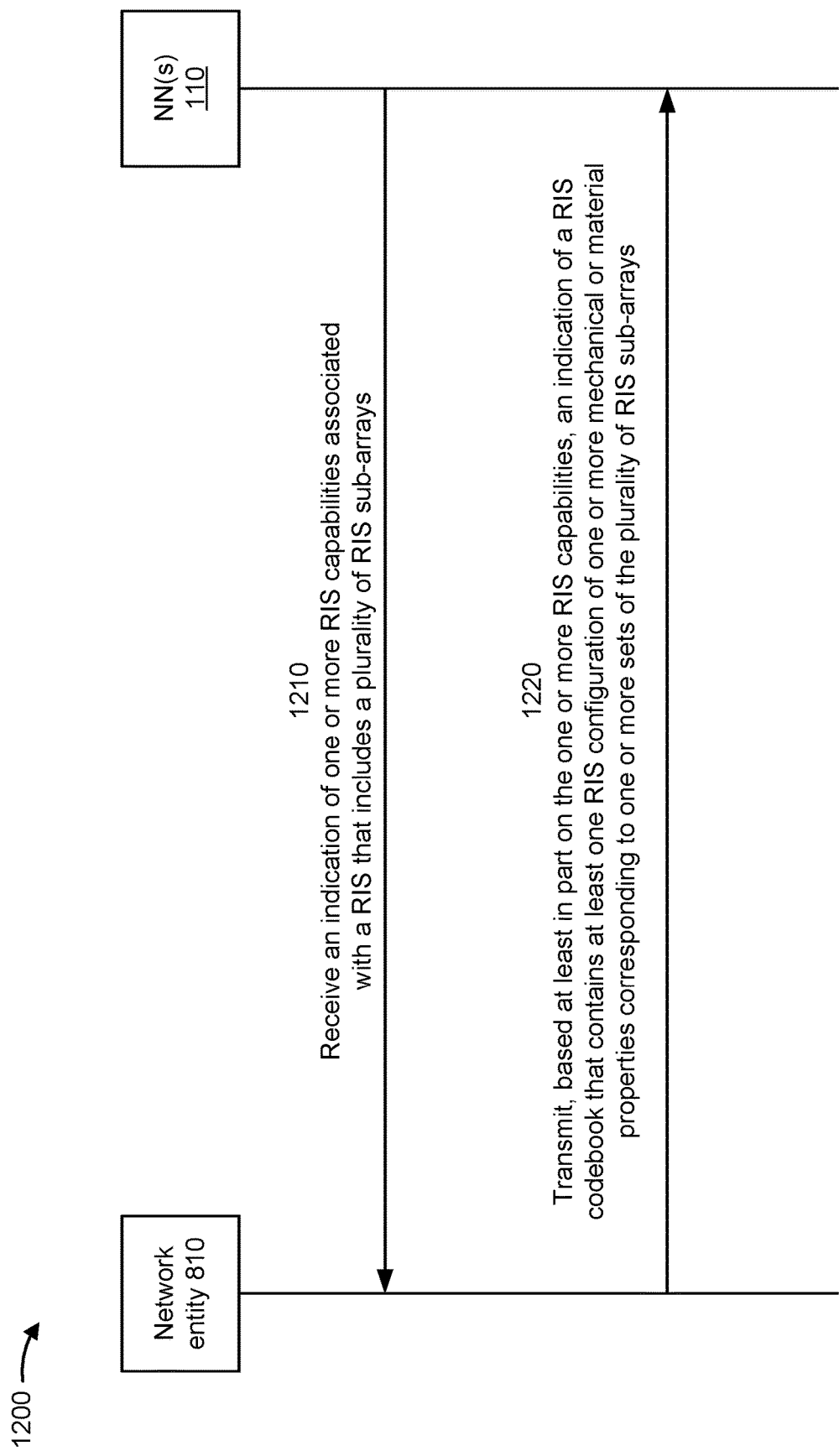
FIG. 12 is a diagram illustrating an example associated with a mechanical-material codebook, in accordance with the present disclosure.

FIG. 12 is a diagram illustrating an example 1200 associated with a mechanical-material codebook, in accordance with the present disclosure. As shown in FIG. 12, the network entity 810 and one or more network nodes 110 may communicate with one another.

As shown by reference number 1210, the network entity 810 may receive an indication of one or more RIS capabilities associated with a RIS that includes a plurality of RIS subarrays. The one or more RIS capabilities may be associated with the RIS (e.g., RIS 140) in that the one or more RIS capabilities may be capabilities of the RIS.

In some aspects, the one or more RIS capabilities may indicate one or more orientation or tilt range limits of one or more RIS subarrays of the plurality of RIS subarrays. For example, the one or more RIS capabilities may include subarray tilt and/or orientation range limits (e.g., in terms of roll, pitch, and/or yaw).

In some aspects, the one or more RIS capabilities may indicate one or more rotation or tilt rates of one or more RIS subarrays of the plurality of RIS subarrays. For example, the one or more RIS capabilities may include rates of rotation and/or tilting (e.g., in terms of degrees per second).

In some aspects, the one or more RIS capabilities may indicate a shaping capability of one or more RIS subarrays of the plurality of RIS subarrays. For example, the shaping capability may indicate that the RIS subarrays can be mechanically adjusted to resemble a convex or concave mirror.

In some aspects, the one or more RIS capabilities may indicate a tunable substrate permittivity capability of one or more RIS subarrays of the plurality of RIS subarrays. For example, the tunable substrate permittivity capability may indicate that the RIS substrate of each subarray can offer tunable permittivity.

As shown by reference number 1220, the network entity 810 may transmit, based at least in part on the one or more RIS capabilities, an indication of a RIS codebook that contains at least one RIS configuration of one or more mechanical or material properties corresponding to one or more sets of the plurality of RIS subarrays. In some examples, transmitting the indication of the RIS codebook may involve configuring the RIS codebook. For example, the network entity 810 may configure the RIS codebook for the network node 110, a RIS-MT, or the like.

The one or more mechanical or material properties may correspond to respective sets of the plurality of RIS subarrays (e.g., the one or more sets of the plurality of RIS subarrays may be independently configured with the one or more mechanical or material properties). In some examples, the sets of the plurality of RIS subarrays may be mutually exclusive sets of the RIS subarrays identified by the network entity 810 to serve respective network nodes 110.

In some examples, the at least one RIS configuration may be referred to as a "mechanical-material codebook" or a "mechanical-material configuration codebook," and the at least one RIS configuration may be referred to as a "mechanical-material configuration." The at least one RIS configuration may be at least one entry in the RIS codebook. The entry or entries in the RIS codebook may be signaled or indicated to the RIS controller by the network entity 810, the network node 110, or the like. In some examples, the network entity 810 may initiate or perform mechanical-material reconfiguration of the one or more RIS subarrays. For example, as explained as follows, the mechanical-material reconfiguration may change the one or more mechanical or material properties of the one or more RIS subarrays, such as tilt or orientation, substrate permittivity, position, shape (e.g., to mimic (e.g., approximate) a convex mirror), or the like.

In some aspects, the one or more mechanical or material properties may include folding of one or more RIS subarrays of the plurality of RIS subarrays. For example, the folding may be mechanical folding of the one of more RIS subarrays that are represented as entries in the at least one RIS configuration.

In some aspects, the one or more mechanical or material properties may include one or more orientations or tilts of one or more RIS subarrays of the plurality of RIS subarrays. For example, the network entity 810 may identify a mechanical-material configuration that includes orientation and/or tilt for one or more RIS subarrays in each set of the plurality of RIS subarrays.

In some aspects, the one or more mechanical or material properties may include one or more positions of one or more RIS subarrays of the plurality of RIS subarrays. For example, the network entity 810 may identify a mechanical-material configuration that includes a position for one or more RIS subarrays in each set of the plurality of RIS subarrays.

In some aspects, the one or more mechanical or material properties may include one or more shapes of one or more RIS subarrays of the plurality of RIS subarrays. For example, the network entity 810 may identify a mechanical-material configuration that includes one or more shapes for one or more RIS subarrays in each set of the plurality of RIS subarrays. The one or more shapes may be in accordance with the shaping capability of the one or more RIS subarrays. For example, the one or more shapes may cause the one or more RIS subarrays to resemble a convex or concave mirror.

In some aspects, the one or more mechanical or material properties include one or more substrate permittivities of one or more RIS subarrays of the plurality of RIS subarrays. For example, the network entity 810 may identify a mechanical-material configuration that includes one or more substrate permittivities for one or more RIS subarrays in each set of the plurality of RIS subarrays. The one or more substrate permittivities may be configured via one or more RIS codebook entries.

In some aspects, the network entity 810 may transmit an indication of the at least one RIS configuration. For example, the network entity 810 may convey the mechanical-material configuration to the RIS-MT (e.g., the RIS controller) via an index identifying the mechanical-material configuration from a mechanical-material configuration codebook.

Each network node 110 may control (e.g., via electronic tuning of components), a corresponding assigned set of RIS subarrays by communicating an index associated with another codebook to a RIS controller. The other codebook (e.g., an electronic codebook) may also be configured by the network entity 810 for the network node 110 and/or the RIS-MT.

As indicated above, FIG. 12 is provided as an example. Other examples may differ from what is described with respect to FIG. 12.

Figure 13:
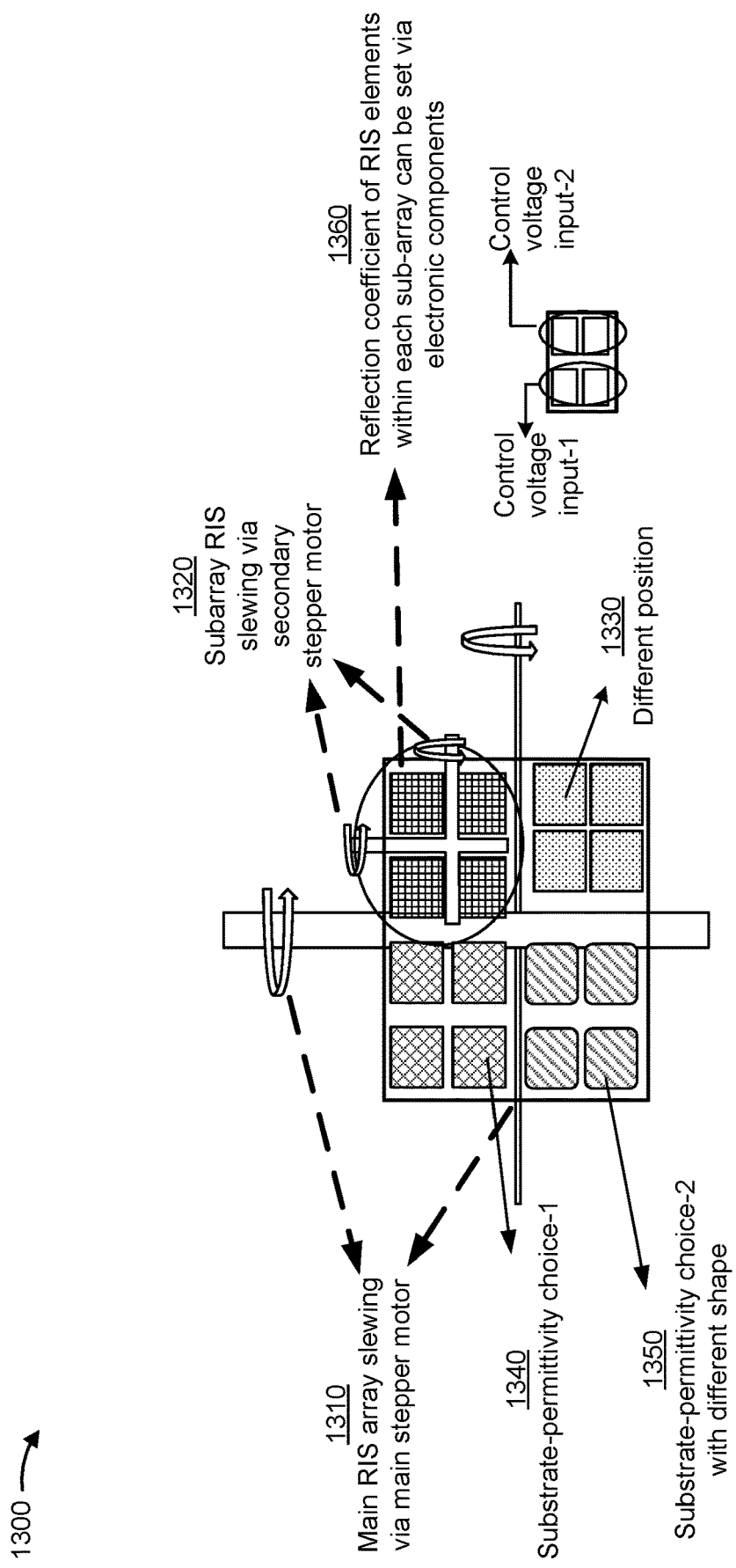
FIG. 13 is a diagram illustrating an example of an electro-mechanical RIS with independently controllable RIS subarrays, in accordance with the present disclosure.

FIG. 13 is a diagram illustrating an example 1300 of an electro-mechanical RIS with independently controllable RIS subarrays, in accordance with the present disclosure.

In some examples, the electro-mechanical RIS may be configured with one or more positions of the RIS subarrays. For example, as shown by reference number 1310, the position of the electro-mechanical RIS may be controlled by slewing the electro-mechanical RIS (e.g., the main RIS array) via a main stepper motor (e.g., a main array slewing motor). Additionally, or alternatively, as shown by reference number 1320, the position(s) of individual RIS subarrays may be controlled by slewing the RIS subarrays via one or more secondary stepper motors (e.g., one or more secondary sub-array slewing motors). For example, as shown by reference number 1330, one of the RIS subarrays is positioned differently, relative to the electro-mechanical RIS, than the other RIS subarrays. In some examples, the main stepper motor and each secondary stepper motor may be independently controlled by the network node 110 via a control link from the network node 110 to the RIS-MT.

In some examples, the electro-mechanical RIS may be configured with one or more substrate permittivities of the RIS subarrays. For example, as shown by reference number 1340, a RIS subarray may be configured with a first substrate permittivity. Additionally, or alternatively, the electro-mechanical RIS may be configured with one or more shapes of the RIS subarrays. For example, as shown by reference number 1350, another RIS subarray may be configured with a second substrate permittivity and with a shape that is different than the other RIS subarrays. The permittivity of the substrates may be tuned using any suitable technology, such as liquid crystals, varying mechanical stress, or the like.

As shown by reference number 1360, reflection coefficients of RIS elements within each RIS subarray may be set via electronic components. For example, the electro-mechanical RIS may apply a first control voltage input to a first set of RIS elements within a RIS subarray and a second control voltage input to a second set of RIS elements within the RIS subarray.

As indicated above, FIG. 13 is provided as an example. Other examples may differ from what is described with respect to FIG. 13.

Figure 14:
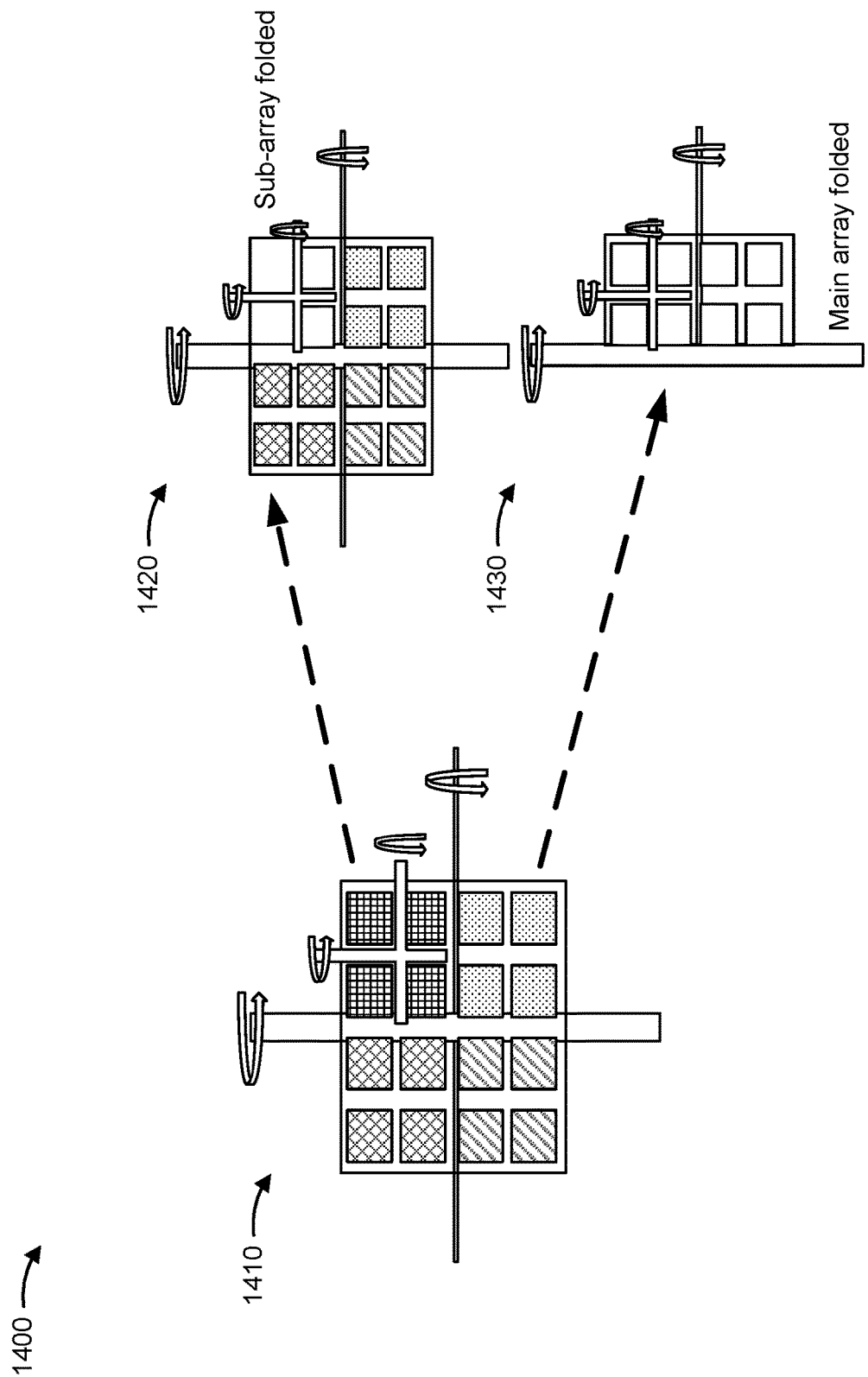
FIG. 14 is a diagram illustrating an example of an electro-mechanical RIS with additional foldability, in accordance with the present disclosure.

FIG. 14 is a diagram illustrating an example 1400 of an electro-mechanical RIS with additional foldability, in accordance with the present disclosure.

The electro-mechanical RIS may be configured with folding of the one or more RIS subarrays. As shown by reference number 1410, the electro-mechanical RIS may be configured in an open (e.g., unfolded) configuration. As shown by reference number 1420, the electro-mechanical RIS may be configured in a folded configuration with a folded RIS subarray. As shown by reference number 1430, the electro-mechanical RIS may be configured in a folded configuration with the main RIS array folded (e.g., with multiple RIS subarrays folded on each other). In some examples, the back-end of the RIS may be made of an absorbing material (e.g., a material that has the property of absorbing, rather than reflecting, electromagnetic radiation). Control circuitry of the RIS may be sandwiched between the front RIS array and the RIS back-end and, thus, may not be exposed. Upon folding the RIS array or RIS subarray(s), the folded RIS array or RIS subarray(s) may absorb incident signals.

As indicated above, FIG. 14 is provided as an example. Other examples may differ from what is described with respect to FIG. 14.

Figure 15:
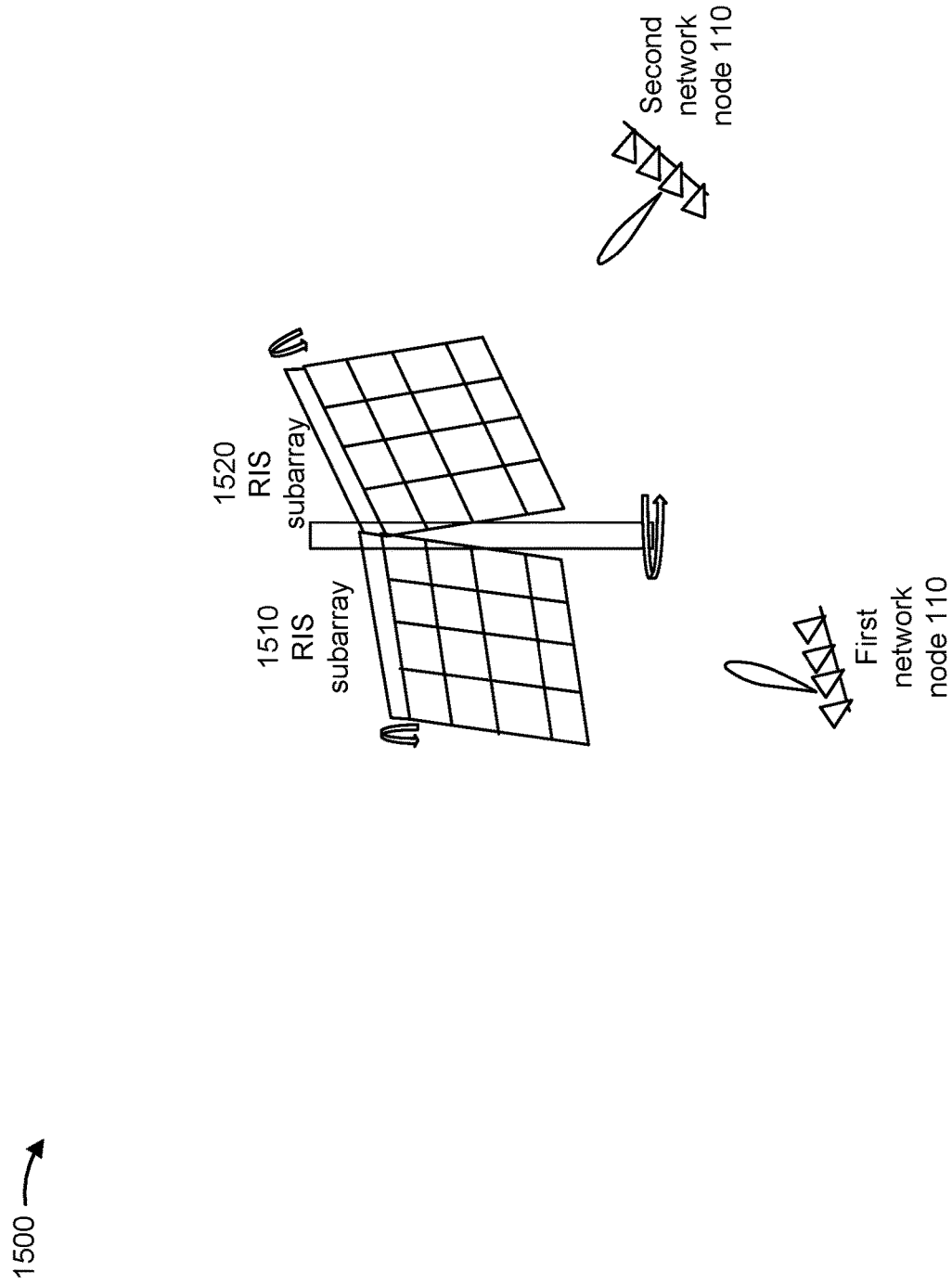
FIG. 15 is a diagram illustrating an example of cross-link interference (CLI) assessment signaling, in accordance with the present disclosure.

FIG. 15 is a diagram illustrating an example 1500 of CLI assessment signaling, in accordance with the present disclosure. As shown, first and second network nodes 110 may communicate via RIS subarrays 1510 and 1520.

In some examples, SSBs transmitted from the first network node 110 may be reflected from RIS subarray 1520 while RIS subarray 1510 is in a folded state or set to an absorbing state. For example, after mechanical reorientation of RIS subarray 1520, an effective illumination area of the front face of RIS subarray 1520 may become smaller for the first network node 110. The back-side of RIS subarray 1520, which may be more exposed to incident signals from the first network node 110, may be coated with an absorbing material and/or set with a permittivity that decreases the responsiveness of RIS subarray 1520 to incident signals from the first network node 110. UEs served by the second network node 110 or other configured nodes may take measurements of the SSB and report the measurements to the second network node 110, which may convey the reports to the network entity 810. Thus, CLI may be mitigated.

In some examples, SSBs transmitted from the second network node 110 may be reflected from RIS subarray 1510 while RIS subarray 1520 is in a folded state or set to an absorbing state. For example, after mechanical reorientation of RIS subarray 1510, an effective illumination area of the front face of RIS subarray 1510 may become smaller for the second network node 110. The back-side of RIS subarray 1510, which may be more exposed to incident signals from the second network node 110, may be coated with an absorbing material and/or set with a permittivity that decreases the responsiveness of RIS subarray 1510 to incident signals from the second network node 110. UEs served by the first network node 110 or other configured nodes may take measurements of the SSB and report the measurements to the first network node 110, which may convey the reports to the network entity 810. Thus, CLI may be mitigated.

As indicated above, FIG. 15 is provided as an example. Other examples may differ from what is described with respect to FIG. 15.

Transmitting an indication of a RIS codebook containing at least one RIS configuration may enable a RIS-assisted communications system that achieves improvement over (e.g., overcomes shortcomings attributable to) static partitioning and TDM-based RIS operation. For example, the RIS may simultaneously provide assistance to two or more transmitters serving two or more receivers with reduced CLI, improved spectral efficiency, increased flexibility, reduce power consumption, or the like, compared to RIS deployments involving static partitioning or TDM-based RIS operation. As a result, the RIS may be fully exploited, thereby covering RIS deployment costs.

Transmitting an indication of a RIS codebook containing at least one RIS configuration that is associated with first network node and one or more second network nodes may provide minimal loss in directivity in cases where the first network node is associated with static network coverage and the one or more second network nodes are associated with dynamic network coverage. Additionally, or alternatively, transmitting an indication of a RIS codebook containing at least one RIS configuration that is associated with first network node and one or more second network nodes may reduce power consumption compared to reconfiguring an electronic configuration (e.g., altering one or more applied voltages) or a mechanical configuration of the RIS (e.g., in terms of altering orientations, positions, shapes of one or more RIS subarrays, or the like). Transmitting the FDM configuration associated with the first network node and the one or more second network nodes may help to further alleviate CLI.

Transmitting an indication of a RIS codebook containing at least one RIS configuration of one or more mechanical or material properties corresponding to one or more sets of the plurality of RIS subarrays may improve network coverage in cases where the first and second network nodes are associated with dynamic network coverage (e.g., in cases where the dynamic network coverage associated with the first network node would prompt frequent changes to the RIS codebook containing the at least one RIS configuration that is associated with the first network node and the one or more second network nodes). For example, a RIS, such as an electro-mechanical RIS capable of exploiting electronic, mechanical, and/or material (e.g., substrate) reconfiguration to simultaneously assist multiple network nodes, may mitigate CLI by tilting (e.g., changing orientations) and/or tuning a position, shape, and/or substrate permittivity of the RIS subarrays. Transmitting an indication of a RIS codebook containing at least one RIS configuration of one or more mechanical or material properties corresponding to one or more sets of the plurality of RIS subarrays may enable separate sets of RIS subarrays to serve different network nodes (which may simplify and/or decouple RIS control), maintaining mechanical configuration (which may reduce power consumption), and/or reconfiguring (e.g., retuning) electronic components within each subarray (which may be accomplished quickly and with reduced power consumption).

The one or more RIS capabilities indicating a tunable substrate permittivity capability of one or more RIS subarrays of the plurality of RIS subarrays may influence an interaction of the RIS array and/or RIS subarray(s) with an incident electric field and, consequently, reflection/refraction performance, thereby impacting gain and CLI. The one or more mechanical or material properties including one or more shapes of one or more RIS subarrays of the plurality of RIS subarrays may enable a network node to serve a wider area by realizing a broader beam (e.g., in cases where the shape(s) approximate a convex mirror).

Figure 16:
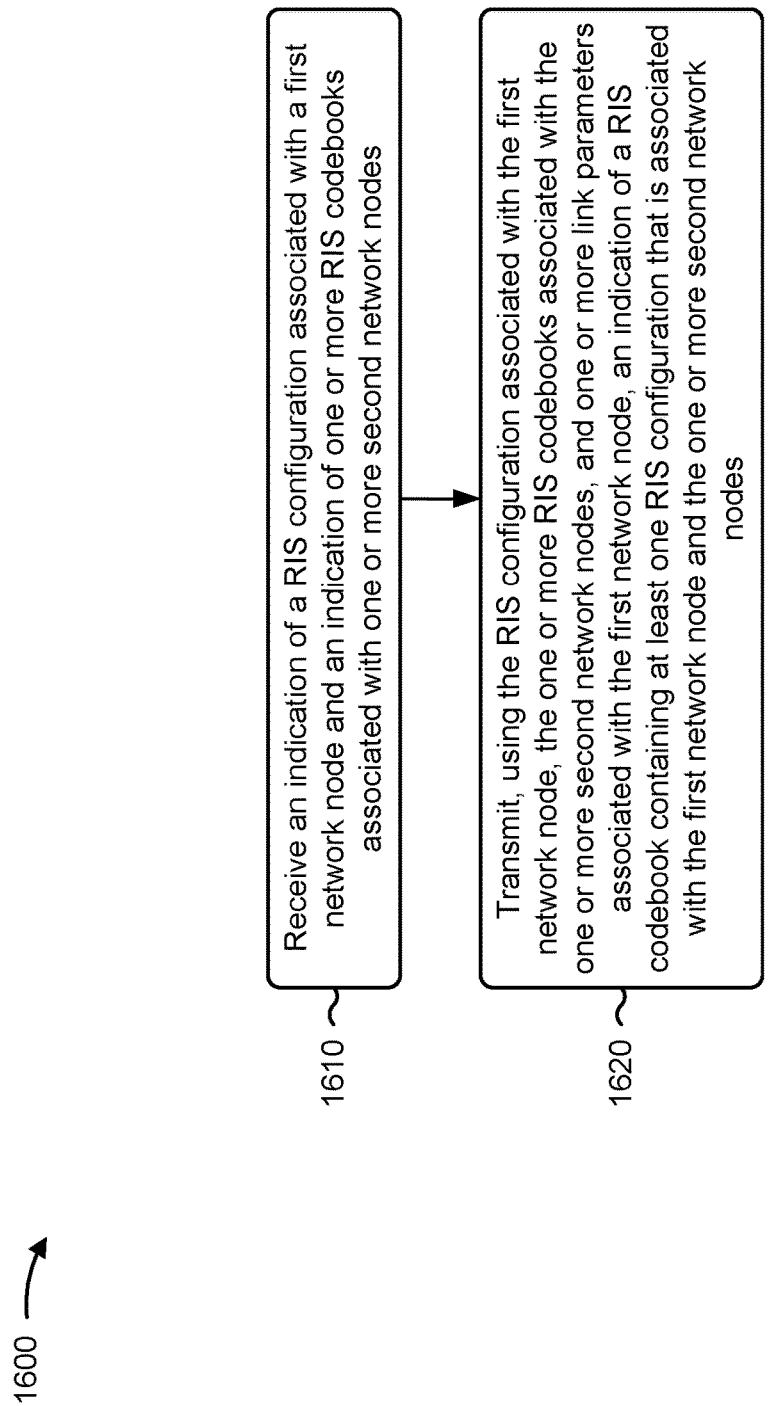
FIG. 16 is a diagram illustrating an example process performed, for example, at a network entity or an apparatus of a network entity, in accordance with the present disclosure.

FIG. 16 is a diagram illustrating an example process 1600 performed, for example, at a network entity or an apparatus of a network entity, in accordance with the present disclosure. Example process 1600 is an example where the apparatus or the network entity (e.g., network node 110) performs operations associated with a RIS codebook.

As shown in FIG. 16, in some aspects, process 1600 may include receiving an indication of a RIS configuration associated with a first network node and an indication of one or more RIS codebooks associated with one or more second network nodes (block 1610). For example, the network entity (e.g., using reception component 1802 and/or communication manager 1806, depicted in FIG. 18) may receive an indication of a RIS configuration associated with a first network node and an indication of one or more RIS codebooks associated with one or more second network nodes, as described above. In some examples, the network entity may identify the RIS configuration and/or the one or more RIS codebooks based at least in part on explicit estimates of relevant directions and distances (e.g., leveraging positioning-based methods). In some examples, the network entity may identify the RIS configuration and/or the one or more RIS codebooks based at least in part on SSB transmission-based training schemes. For instance, a network node may transmit pilot signals that are reflected or refracted by the RIS under respective configurations and measured by one or more receivers in a target coverage region. The one or more receivers may convey the measurements (e.g., signal strengths) to network node and/or the network entity. The measured reflected or refracted signal strengths may provide information associated with pointing directions under different RIS configurations. This information may be further refined via training using hierarchical (e.g., broad-to-narrow) RIS reflect or refract beams.

As further shown in FIG. 16, in some aspects, process 1600 may include transmitting, using the RIS configuration associated with the first network node, the one or more RIS codebooks associated with the one or more second network nodes, and one or more link parameters associated with the first network node, an indication of a RIS codebook containing at least one RIS configuration that is associated with the first network node and the one or more second network nodes (block 1620). For example, the network entity (e.g., using transmission component 1804 and/or communication manager 1806, depicted in FIG. 18) may transmit, using the RIS configuration associated with the first network node, the one or more RIS codebooks associated with the one or more second network nodes, and one or more link parameters associated with the first network node, an indication of a RIS codebook containing at least one RIS configuration that is associated with the first network node and the one or more second network nodes, as described above. In some examples, the at least one RIS configuration may simultaneously enable the first network node 110 to communicate with a UE in accordance with the one or more link parameters and the one or more second network nodes 110 to communicate with one or more other UEs. The one or more link parameters may include a signal gain, signal gain threshold, a main lobe width, an interference threshold, or the like.

Process 1600 may include additional aspects, such as any single aspect or any combination of aspects described below and/or in connection with one or more other processes described elsewhere herein.

In a first aspect, the one or more link parameters include a signal gain associated with the RIS configuration associated with the first network node.

In a second aspect, alone or in combination with the first aspect, the one or more link parameters include a signal gain threshold associated with the first network node.

In a third aspect, alone or in combination with one or more of the first and second aspects, the one or more link parameters include a main lobe width associated with the first network node.

In a fourth aspect, alone or in combination with one or more of the first through third aspects, the one or more link parameters include an interference threshold associated with the first network node.

In a fifth aspect, alone or in combination with one or more of the first through fourth aspects, process 1600 includes transmitting an indication of one or more associations between the RIS codebook and the one or more RIS codebooks associated with the one or more second network nodes.

In a sixth aspect, alone or in combination with one or more of the first through fifth aspects, process 1600 includes transmitting an indication of at least one association between the at least one RIS configuration and at least one RIS configuration contained in the one or more RIS codebooks associated with the one or more second network nodes.

In a seventh aspect, alone or in combination with one or more of the first through sixth aspects, process 1600 includes receiving an indication of one or more updated link parameters.

In an eighth aspect, alone or in combination with one or more of the first through seventh aspects, process 1600 includes transmitting, based at least in part on the one or more updated link parameters, an indication of an updated RIS codebook containing at least one updated RIS configuration that is associated with the first network node and the one or more second network nodes.

In a ninth aspect, alone or in combination with one or more of the first through eighth aspects, process 1600 includes transmitting a RIS configuration associated with RIS subarrays.

In a tenth aspect, alone or in combination with one or more of the first through ninth aspects, process 1600 includes transmitting an indication of a link parameter updating rate threshold or a RIS codebook updating rate threshold.

In an eleventh aspect, alone or in combination with one or more of the first through tenth aspects, process 1600 includes transmitting an FDM configuration associated with the first network node and the one or more second network nodes.

In a twelfth aspect, alone or in combination with one or more of the first through eleventh aspects, the at least one RIS configuration is associated with reflection or refraction of an incident signal.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
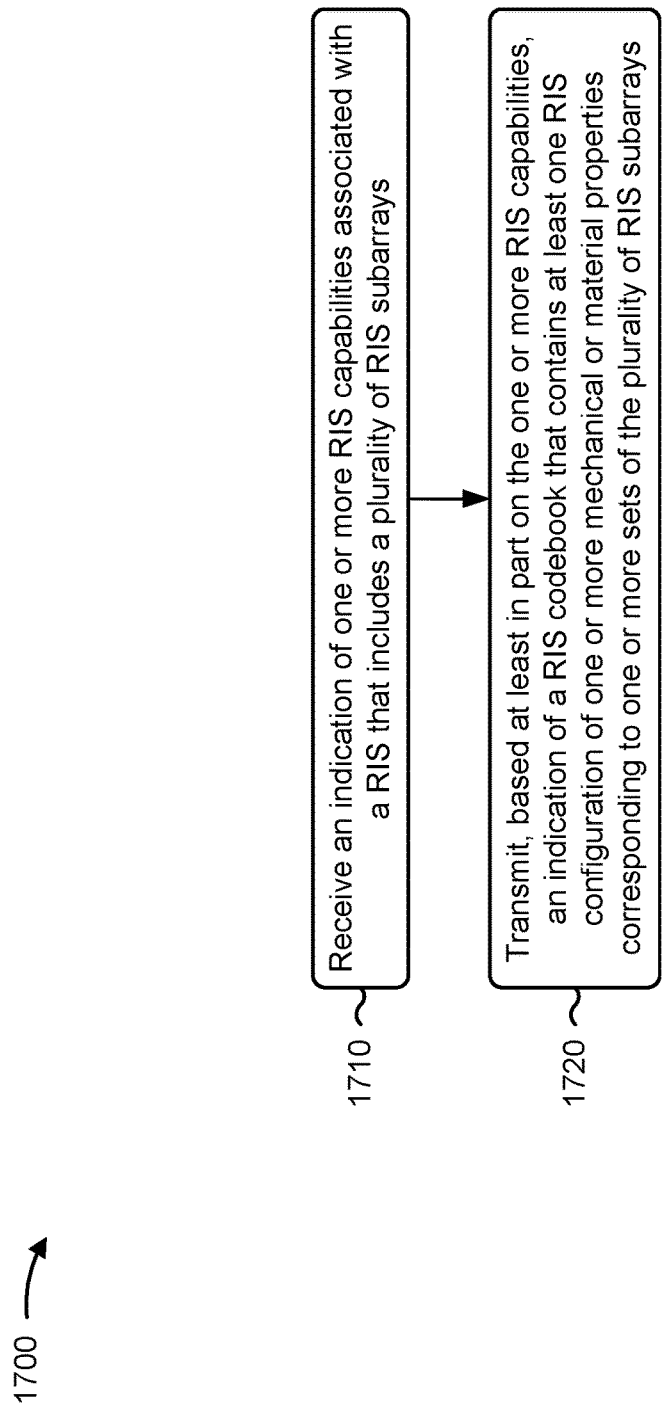
FIG. 17 is a diagram illustrating an example process performed, for example, at a network entity or an apparatus of a network entity, in accordance with the present disclosure.

FIG. 17 is a diagram illustrating an example process 1700 performed, for example, at a network entity or an apparatus of a network entity, in accordance with the present disclosure. Example process 1700 is an example where the apparatus or the network entity (e.g., network node 110) performs operations associated with a RIS codebook.

As shown in FIG. 17, in some aspects, process 1700 may include receiving an indication of one or more RIS capabilities associated with a RIS that includes a plurality of RIS subarrays (block 1710). For example, the network entity (e.g., using reception component 1802 and/or communication manager 1806, depicted in FIG. 18) may receive an indication of one or more RIS capabilities associated with a RIS that includes a plurality of RIS subarrays, as described above. In some examples, the one or more RIS capabilities may indicate one or more orientation or tilt range limits of one or more RIS subarrays, one or more rotation or tilt rates of one or more RIS subarrays, a shaping capability of one or more RIS subarrays, a tunable substrate permittivity capability of one or more RIS subarrays, or the like.

As further shown in FIG. 17, in some aspects, process 1700 may include transmitting, based at least in part on the one or more RIS capabilities, an indication of a RIS codebook that contains at least one RIS configuration of one or more mechanical or material properties corresponding to one or more sets of the plurality of RIS subarrays (block 1720). For example, the network entity (e.g., using transmission component 1804 and/or communication manager 1806, depicted in FIG. 18) may transmit, based at least in part on the one or more RIS capabilities, an indication of a RIS codebook that contains at least one RIS configuration of one or more mechanical or material properties corresponding to one or more sets of the plurality of RIS subarrays, as described above. In some examples, the one or more mechanical or material properties may correspond to respective sets (e.g. mutually exclusive sets) of the plurality of RIS subarrays. For example, the one or more sets of the plurality of RIS subarrays may be independently configured with the one or more mechanical or material properties. In some examples, the one or more mechanical or material properties may include folding of one or more RIS subarrays, one or more orientations or tilts of one or more RIS subarrays, one or more positions of one or more RIS subarrays, one or more shapes of one or more RIS subarrays, one or more substrate permittivities of one or more RIS subarrays, or the like.

Process 1700 may include additional aspects, such as any single aspect or any combination of aspects described below and/or in connection with one or more other processes described elsewhere herein.

In a first aspect, the one or more RIS capabilities indicate one or more orientation or tilt range limits of one or more RIS subarrays of the plurality of RIS subarrays.

In a second aspect, alone or in combination with the first aspect, the one or more RIS capabilities indicate one or more rotation or tilt rates of one or more RIS subarrays of the plurality of RIS subarrays.

In a third aspect, alone or in combination with one or more of the first and second aspects, the one or more RIS capabilities indicate a shaping capability of one or more RIS subarrays of the plurality of RIS subarrays.

In a fourth aspect, alone or in combination with one or more of the first through third aspects, the one or more RIS capabilities indicate a tunable substrate permittivity capability of one or more RIS subarrays of the plurality of RIS subarrays.

In a fifth aspect, alone or in combination with one or more of the first through fourth aspects, the one or more mechanical or material properties include folding of one or more RIS subarrays of the plurality of RIS subarrays.

In a sixth aspect, alone or in combination with one or more of the first through fifth aspects, the one or more mechanical or material properties include one or more orientations or tilts of one or more RIS subarrays of the plurality of RIS subarrays.

In a seventh aspect, alone or in combination with one or more of the first through sixth aspects, the one or more mechanical or material properties include one or more positions of one or more RIS subarrays of the plurality of RIS subarrays.

In an eighth aspect, alone or in combination with one or more of the first through seventh aspects, the one or more mechanical or material properties include one or more shapes of one or more RIS subarrays of the plurality of RIS subarrays.

In a ninth aspect, alone or in combination with one or more of the first through eighth aspects, the one or more mechanical or material properties include one or more substrate permittivities of one or more RIS subarrays of the plurality of RIS subarrays.

In a tenth aspect, alone or in combination with one or more of the first through ninth aspects, process 1700 includes transmitting an indication of the at least one RIS configuration.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
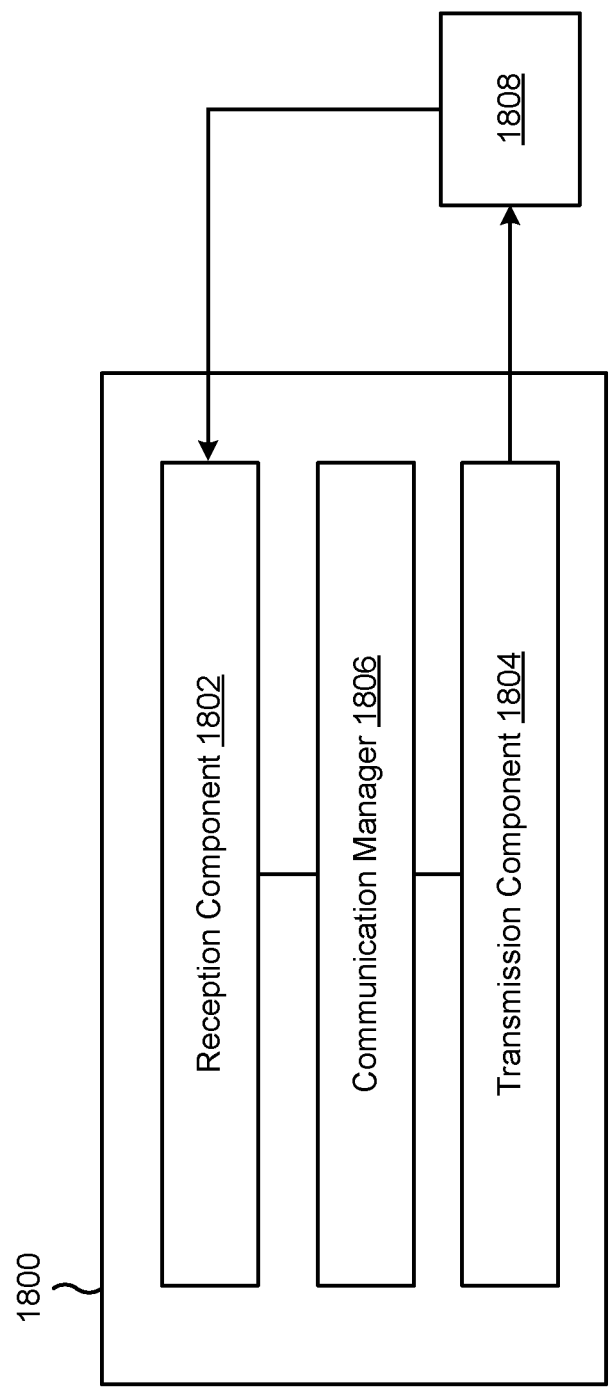
FIG. 18 is a diagram of an example apparatus for wireless communication, in accordance with the present disclosure.

FIG. 18 is a diagram of an example apparatus 1800 for wireless communication, in accordance with the present disclosure. The apparatus 1800 may be a network entity (e.g., a network node), or a network entity (e.g., a network node) may include the apparatus 1800. In some aspects, the apparatus 1800 includes a reception component 1802, a transmission component 1804, and/or a communication manager 1806, which may be in communication with one another (for example, via one or more buses and/or one or more other components). In some aspects, the communication manager 1806 is the communication manager 150 described in connection with FIG. 1. As shown, the apparatus 1800 may communicate with another apparatus 1808, such as a UE or a network node (such as a CU, a DU, an RU, or a base station), using the reception component 1802 and the transmission component 1804.

In some aspects, the apparatus 1800 may be configured to perform one or more operations described herein in connection with FIGS. 8-15. Additionally, or alternatively, the apparatus 1800 may be configured to perform one or more processes described herein, such as process 1600 of FIG. 16, process 1700 of FIG. 17, or a combination thereof. In some aspects, the apparatus 1800 and/or one or more components shown in FIG. 18 may include one or more components of the network node described in connection with FIG. 2. Additionally, or alternatively, one or more components shown in FIG. 18 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1802 may receive communications, such as reference signals, control information, data communications, or a combination thereof, from the apparatus 1808. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1800. In some aspects, the reception component 1802 may include one or more antennas, one or more modems, one or more demodulators, one or more MIMO detectors, one or more receive processors, one or more controllers/processors, one or more memories, or a combination thereof, of the network node described in connection with FIG. 2. In some aspects, the reception component 1802 and/or the transmission component 1804 may include or may be included in a network interface. The network interface may be configured to obtain and/or output signals for the apparatus 1800 via one or more communications links, such as a backhaul link, a midhaul link, and/or a fronthaul link.

The transmission component 1804 may transmit communications, such as reference signals, control information, data communications, or a combination thereof, to the apparatus 1808. In some aspects, one or more other components of the apparatus 1800 may generate communications and may provide the generated communications to the transmission component 1804 for transmission to the apparatus 1808. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1808. In some aspects, the transmission component 1804 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 1804 may be co-located with the reception component 1802 in one or more transceivers.

The communication manager 1806 may support operations of the reception component 1802 and/or the transmission component 1804. For example, the communication manager 1806 may receive information associated with configuring reception of communications by the reception component 1802 and/or transmission of communications by the transmission component 1804. Additionally, or alternatively, the communication manager 1806 may generate and/or provide control information to the reception component 1802 and/or the transmission component 1804 to control reception and/or transmission of communications.

The reception component 1802 may receive an indication of a RIS configuration associated with a first network node and an indication of one or more RIS codebooks associated with one or more second network nodes. The transmission component 1804 may transmit, using the RIS configuration associated with the first network node, the one or more RIS codebooks associated with the one or more second network nodes, and one or more link parameters associated with the first network node, an indication of a RIS codebook containing at least one RIS configuration that is associated with the first network node and the one or more second network nodes.

The transmission component 1804 may transmit an indication of one or more associations between the RIS codebook and the one or more RIS codebooks associated with the one or more second network nodes.

The transmission component 1804 may transmit an indication of at least one association between the at least one RIS configuration and at least one RIS configuration contained in the one or more RIS codebooks associated with the one or more second network nodes.

The reception component 1802 may receive an indication of one or more updated link parameters.

The transmission component 1804 may transmit, based at least in part on the one or more updated link parameters, an indication of an updated RIS codebook containing at least one updated RIS configuration that is associated with the first network node and the one or more second network nodes.

The transmission component 1804 may transmit a RIS configuration associated with RIS subarrays.

The transmission component 1804 may transmit an indication of a link parameter updating rate threshold or a RIS codebook updating rate threshold.

The transmission component 1804 may transmit a FDM configuration associated with the first network node and the one or more second network nodes.

The reception component 1802 may receive an indication of one or more RIS capabilities associated with a RIS that includes a plurality of RIS subarrays. The transmission component 1804 may transmit, based at least in part on the one or more RIS capabilities, an indication of a RIS codebook that contains at least one RIS configuration of one or more mechanical or material properties corresponding to one or more sets of the plurality of RIS subarrays.

The transmission component 1804 may transmit an indication of the at least one RIS configuration.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

The following provides an overview of some Aspects of the present disclosure:

Aspect 1: A method of wireless communication performed by a network entity, comprising: receiving an indication of a RIS configuration associated with a first network node and an indication of one or more RIS codebooks associated with one or more second network nodes; and transmitting, using the RIS configuration associated with the first network node, the one or more RIS codebooks associated with the one or more second network nodes, and one or more link parameters associated with the first network node, an indication of a RIS codebook containing at least one RIS configuration that is associated with the first network node and the one or more second network nodes.

Aspect 2: The method of Aspect 1, wherein the one or more link parameters include a signal gain associated with the RIS configuration associated with the first network node.

Aspect 3: The method of any of Aspects 1-2, wherein the one or more link parameters include a signal gain threshold associated with the first network node.

Aspect 4: The method of any of Aspects 1-3, wherein the one or more link parameters include a main lobe width associated with the first network node.

Aspect 5: The method of any of Aspects 1-4, wherein the one or more link parameters include an interference threshold associated with the first network node.

Aspect 6: The method of any of Aspects 1-5, further comprising: transmitting an indication of one or more associations between the RIS codebook and the one or more RIS codebooks associated with the one or more second network nodes.

Aspect 7: The method of Aspect 6, further comprising: transmitting an indication of at least one association between the at least one RIS configuration and at least one RIS configuration contained in the one or more RIS codebooks associated with the one or more second network nodes.

Aspect 8: The method of any of Aspects 1-7, further comprising: receiving an indication of one or more updated link parameters.

Aspect 9: The method of Aspect 8, further comprising: transmitting, based at least in part on the one or more updated link parameters, an indication of an updated RIS codebook containing at least one updated RIS configuration that is associated with the first network node and the one or more second network nodes.

Aspect 10: The method of any of Aspects 1-9, further comprising: transmitting a RIS configuration associated with RIS subarrays.

Aspect 11: The method of any of Aspects 1-10, further comprising: transmitting an indication of a link parameter updating rate threshold or a RIS codebook updating rate threshold.

Aspect 12: The method of any of Aspects 1-11, further comprising: transmitting an FDM configuration associated with the first network node and the one or more second network nodes.

Aspect 13: The method of any of Aspects 1-12, wherein the at least one RIS configuration is associated with reflection or refraction of an incident signal.

Aspect 14: A method of wireless communication performed by a network entity, comprising: receiving an indication of one or more RIS capabilities associated with a RIS that includes a plurality of RIS subarrays; and transmitting, based at least in part on the one or more RIS capabilities, an indication of a RIS codebook that contains at least one RIS configuration of one or more mechanical or material properties corresponding to one or more sets of the plurality of RIS subarrays.

Aspect 15: The method of Aspect 14, wherein the one or more RIS capabilities indicate one or more orientation or tilt range limits of one or more RIS subarrays of the plurality of RIS subarrays.

Aspect 16: The method of any of Aspects 14-15, wherein the one or more RIS capabilities indicate one or more rotation or tilt rates of one or more RIS subarrays of the plurality of RIS subarrays.

Aspect 17: The method of any of Aspects 14-16, wherein the one or more RIS capabilities indicate a shaping capability of one or more RIS subarrays of the plurality of RIS subarrays.

Aspect 18: The method of any of Aspects 14-17, wherein the one or more RIS capabilities indicate a tunable substrate permittivity capability of one or more RIS subarrays of the plurality of RIS subarrays.

Aspect 19: The method of any of Aspects 14-18, wherein the one or more mechanical or material properties include folding of one or more RIS subarrays of the plurality of RIS subarrays.

Aspect 20: The method of any of Aspects 14-19, wherein the one or more mechanical or material properties include one or more orientations or tilts of one or more RIS subarrays of the plurality of RIS subarrays.

Aspect 21: The method of any of Aspects 14-20, wherein the one or more mechanical or material properties include one or more positions of one or more RIS subarrays of the plurality of RIS subarrays.

Aspect 22: The method of any of Aspects 14-21, wherein the one or more mechanical or material properties include one or more shapes of one or more RIS subarrays of the plurality of RIS subarrays.

Aspect 23: The method of any of Aspects 14-22, wherein the one or more mechanical or material properties include one or more substrate permittivities of one or more RIS subarrays of the plurality of RIS subarrays.

Aspect 24: The method of any of Aspects 14-23, further comprising: transmitting an indication of the at least one RIS configuration.

Aspect 25: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-24.

Aspect 26: An apparatus for wireless communication at a device, the apparatus comprising one or more memories and one or more processors coupled to the one or more memories, the one or more processors configured to cause the device to perform the method of one or more of Aspects 1-24.

Aspect 27: An apparatus for wireless communication, the apparatus comprising at least one means for performing the method of one or more of Aspects 1-24.

Aspect 28: A non-transitory computer-readable medium storing code for wireless communication, the code comprising instructions executable by one or more processors to perform the method of one or more of Aspects 1-24.

Aspect 29: A non-transitory computer-readable medium storing a set of instructions for wireless communication, the set of instructions comprising one or more instructions that, when executed by one or more processors of a device, cause the device to perform the method of one or more of Aspects 1-24.

Aspect 30: A device for wireless communication, the device comprising a processing system that includes one or more processors and one or more memories coupled with the one or more processors, the processing system configured to cause the device to perform the method of one or more of Aspects 1-24.

Aspect 31: An apparatus for wireless communication at a device, the apparatus comprising one or more memories and one or more processors coupled to the one or more memories, the one or more processors individually or collectively configured to cause the device to perform the method of one or more of Aspects 1-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. An apparatus for wireless communication at a network entity, comprising:
   one or more memories; and
   one or more processors, coupled to the one or more memories, configured to cause the network entity to:
      receive an indication of a reconfigurable intelligent surface (RIS) configuration associated with a first network node and an indication of one or more RIS codebooks associated with one or more second network nodes; and
      transmit, using the RIS configuration associated with the first network node, the one or more RIS codebooks associated with the one or more second network nodes, and one or more link parameters associated with the first network node, an indication of a RIS codebook containing at least one RIS configuration that is associated with the first network node and the one or more second network nodes.

2. The apparatus of claim 1, wherein the one or more link parameters include a signal gain associated with the RIS configuration associated with the first network node.

3. The apparatus of claim 1, wherein the one or more link parameters include a signal gain threshold associated with the first network node.

4. The apparatus of claim 1, wherein the one or more link parameters include a main lobe width associated with the first network node.

5. The apparatus of claim 1, wherein the one or more link parameters include an interference threshold associated with the first network node.

6. The apparatus of claim 1, wherein the one or more processors are further configured to cause the network entity to:
   transmit an indication of one or more associations between the RIS codebook and the one or more RIS codebooks associated with the one or more second network nodes.

7. The apparatus of claim 6, wherein the one or more processors are further configured to cause the network entity to:
   transmit an indication of at least one association between the at least one RIS configuration and at least one RIS configuration contained in the one or more RIS codebooks associated with the one or more second network nodes.

8. The apparatus of claim 1, wherein the one or more processors are further configured to cause the network entity to:
   receive an indication of one or more updated link parameters.

9. The apparatus of claim 8, wherein the one or more processors are further configured to cause the network entity to:
   transmit, based at least in part on the one or more updated link parameters, an indication of an updated RIS codebook containing at least one updated RIS configuration that is associated with the first network node and the one or more second network nodes.

10. The apparatus of claim 1, wherein the one or more processors are further configured to cause the network entity to:
    transmit a RIS configuration associated with RIS subarrays.

11. The apparatus of claim 1, wherein the one or more processors are further configured to cause the network entity to:
    transmit an indication of a link parameter updating rate threshold or a RIS codebook updating rate threshold.

12. The apparatus of claim 1, wherein the one or more processors are further configured to cause the network entity to:
    transmit a frequency division multiplexing (FDM) configuration associated with the first network node and the one or more second network nodes.

13. The apparatus of claim 1, wherein the at least one RIS configuration is associated with reflection or refraction of an incident signal.

14. An apparatus for wireless communication at a network entity, comprising:
    one or more memories; and
    one or more processors, coupled to the one or more memories, configured to cause the network entity to:
       receive an indication of one or more reconfigurable intelligent surface (RIS) capabilities associated with a RIS that includes a plurality of RIS subarrays; and
       transmit, based at least in part on the one or more RIS capabilities, an indication of a RIS codebook that contains at least one RIS configuration of one or more mechanical or material properties corresponding to one or more sets of the plurality of RIS subarrays.

15. The apparatus of claim 14, wherein the one or more RIS capabilities indicate one or more orientation or tilt range limits of one or more RIS subarrays of the plurality of RIS subarrays.

16. The apparatus of claim 14, wherein the one or more RIS capabilities indicate one or more rotation or tilt rates of one or more RIS subarrays of the plurality of RIS subarrays.

17. The apparatus of claim 14, wherein the one or more RIS capabilities indicate a shaping capability of one or more RIS subarrays of the plurality of RIS subarrays.

18. The apparatus of claim 14, wherein the one or more RIS capabilities indicate a tunable substrate permittivity capability of one or more RIS subarrays of the plurality of RIS subarrays.

19. The apparatus of claim 14, wherein the one or more mechanical or material properties include folding of one or more RIS subarrays of the plurality of RIS subarrays.

20. The apparatus of claim 14, wherein the one or more mechanical or material properties include one or more orientations or tilts of one or more RIS subarrays of the plurality of RIS subarrays.

21. The apparatus of claim 14, wherein the one or more mechanical or material properties include one or more positions of one or more RIS subarrays of the plurality of RIS subarrays.

22. The apparatus of claim 14, wherein the one or more mechanical or material properties include one or more shapes of one or more RIS subarrays of the plurality of RIS subarrays.

23. The apparatus of claim 14, wherein the one or more mechanical or material properties include one or more substrate permittivities of one or more RIS subarrays of the plurality of RIS subarrays.

24. The apparatus of claim 14, wherein the one or more processors are further configured to cause the network entity to:
transmit an indication of the at least one RIS configuration.

25. A method of wireless communication performed by a network entity, comprising:
receiving an indication of a reconfigurable intelligent surface (RIS) configuration associated with a first network node and an indication of one or more RIS codebooks associated with one or more second network nodes; and
transmitting, using the RIS configuration associated with the first network node, the one or more RIS codebooks associated with the one or more second network nodes, and one or more link parameters associated with the first network node, an indication of a RIS codebook containing at least one RIS configuration that is associated with the first network node and the one or more second network nodes.

26. The method of claim 25, wherein the one or more link parameters include a signal gain associated with the RIS configuration associated with the first network node.

27. The method of claim 25, wherein the one or more link parameters include a signal gain threshold associated with the first network node.

28. A method of wireless communication performed by a network entity, comprising:
receiving an indication of one or more reconfigurable intelligent surface (RIS) capabilities associated with a RIS that includes a plurality of RIS subarrays; and
transmitting, based at least in part on the one or more RIS capabilities, an indication of a RIS codebook that contains at least one RIS configuration of one or more mechanical or material properties corresponding to one or more sets of the plurality of RIS subarrays.

29. The method of claim 28, wherein the one or more RIS capabilities indicate one or more orientation or tilt range limits of one or more RIS subarrays of the plurality of RIS subarrays.

30. The method of claim 28, wherein the one or more RIS capabilities indicate one or more rotation or tilt rates of one or more RIS subarrays of the plurality of RIS subarrays.

* * * * *